(12) United States Patent
Butler et al.

(10) Patent No.: US 10,168,492 B2
(45) Date of Patent: Jan. 1, 2019

(54) OPTICAL COUPLING ASSEMBLIES FOR COUPLING OPTICAL CABLES TO SILICON-BASED LASER SOURCES

(71) Applicant: Corning Optical Communications LLC, Hickory, NC (US)

(72) Inventors: Douglas Llewellyn Butler, Painted Post, NY (US); Ying Geng, Sammamish, WA (US); Christopher Paul Lewallen, Hudson, NC (US); James Phillip Luther, Hickory, NC (US); Jerald Lee Overcash, Chine Grove, NC (US); James Scott Sutherland, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 228 days.

(21) Appl. No.: 15/014,560

(22) Filed: Feb. 3, 2016

(65) Prior Publication Data
US 2016/0231513 A1      Aug. 11, 2016

Related U.S. Application Data

(60) Provisional application No. 62/114,753, filed on Feb. 11, 2015.

(51) Int. Cl.
*G02B 6/42* (2006.01)
*G02B 6/38* (2006.01)

(52) U.S. Cl.
CPC ........... *G02B 6/421* (2013.01); *G02B 6/3893* (2013.01); *G02B 6/4214* (2013.01); *G02B 6/4259* (2013.01); *G02B 6/4292* (2013.01); *G02B 6/3885* (2013.01); *G02B 6/4249* (2013.01)

(58) Field of Classification Search
None
See application file for complete search history.

(56) References Cited

U.S. PATENT DOCUMENTS

| | | | |
|---|---|---|---|
| 6,056,448 A | 5/2000 | Sauter et al. | |
| 9,354,406 B2 | 5/2016 | Isenhour et al. | |
| 2002/0106165 A1* | 8/2002 | Arsenault | G02B 6/42 385/89 |
| 2002/0168147 A1 | 11/2002 | Case et al. | |
| 2010/0215317 A1 | 8/2010 | Rolston et al. | |

(Continued)

*Primary Examiner* — Jerry Rahll
(74) *Attorney, Agent, or Firm* — Robert L. Branham

(57) ABSTRACT

Optical coupling assemblies for silicon-based optical sources are disclosed. In one embodiment, an optical coupling assembly includes an optical coupling carrier frame and a jumper cable assembly. The optical coupling carrier frame includes a frame portion defining an integrated circuit opening operable to receive an integrated circuit assembly, and a connector portion extending from the frame portion. The connector portion includes a channel operable to receive an optical connector of an optical cable assembly. The jumper cable assembly is disposed within the connector portion. The jumper cable assembly includes a plurality of jumper optical fibers, a jumper ferrule coupled to a first end of the plurality of jumper optical fibers, and an optical turn assembly coupled to a second end of the plurality of jumper optical fibers. The optical turn assembly is operable to optically turn optical signals propagating within the optical turn assembly.

28 Claims, 19 Drawing Sheets

(56) References Cited

U.S. PATENT DOCUMENTS

| | | |
|---|---|---|
| 2013/0156365 A1 | 6/2013 | Barwicz et al. |
| 2013/0251304 A1 | 9/2013 | Barwicz et al. |
| 2013/0251305 A1 | 9/2013 | Barwicz et al. |
| 2013/0283591 A1 | 10/2013 | Barwicz et al. |
| 2014/0022650 A1 | 1/2014 | Wolterink et al. |
| 2014/0035175 A1 | 2/2014 | Numata et al. |
| 2014/0061979 A1 | 3/2014 | Numata et al. |
| 2014/0355934 A1* | 12/2014 | Shao ................ G02B 6/428 385/33 |
| 2016/0223757 A1* | 8/2016 | Benner ............ G02B 6/3829 |

* cited by examiner

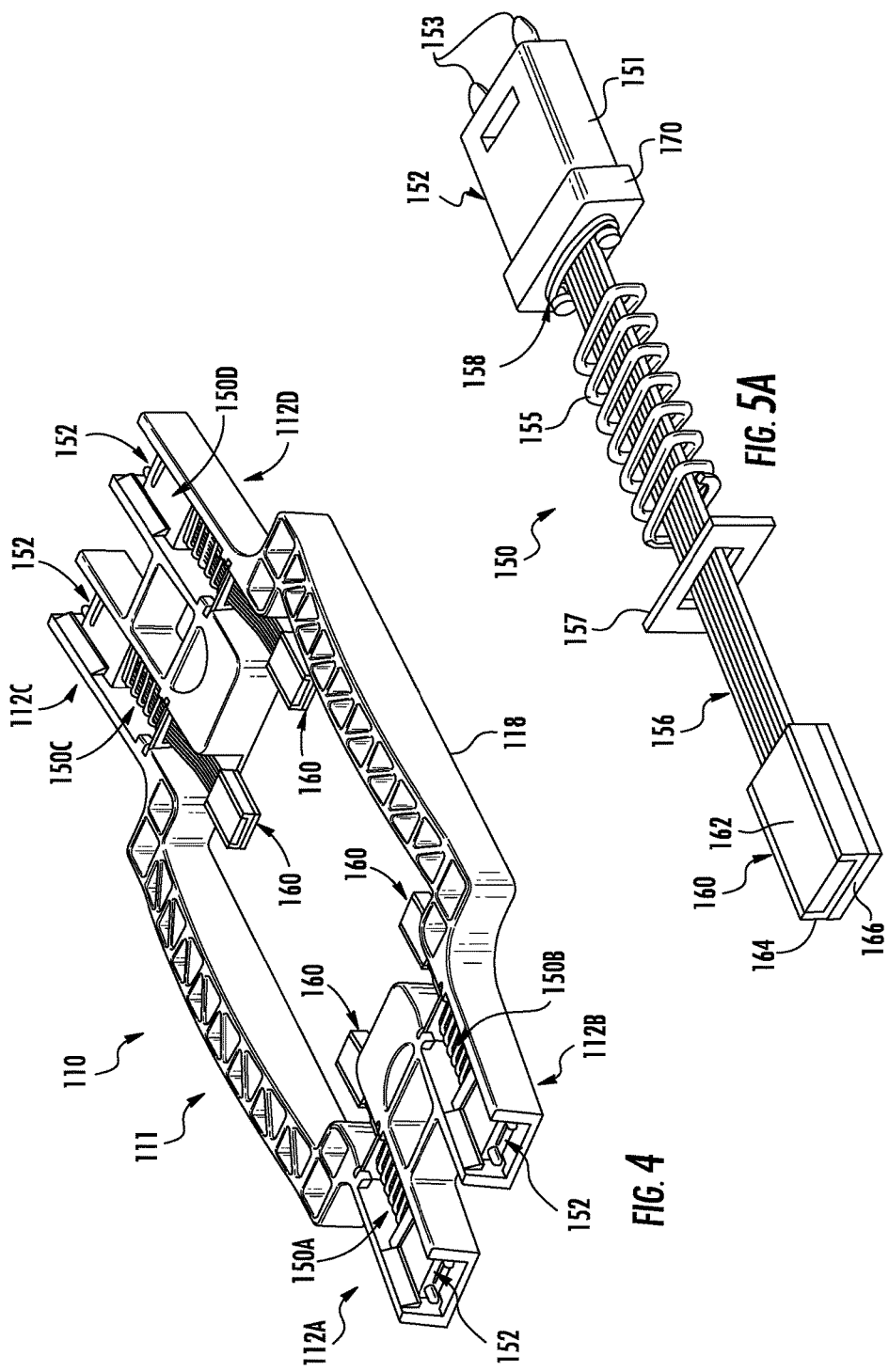

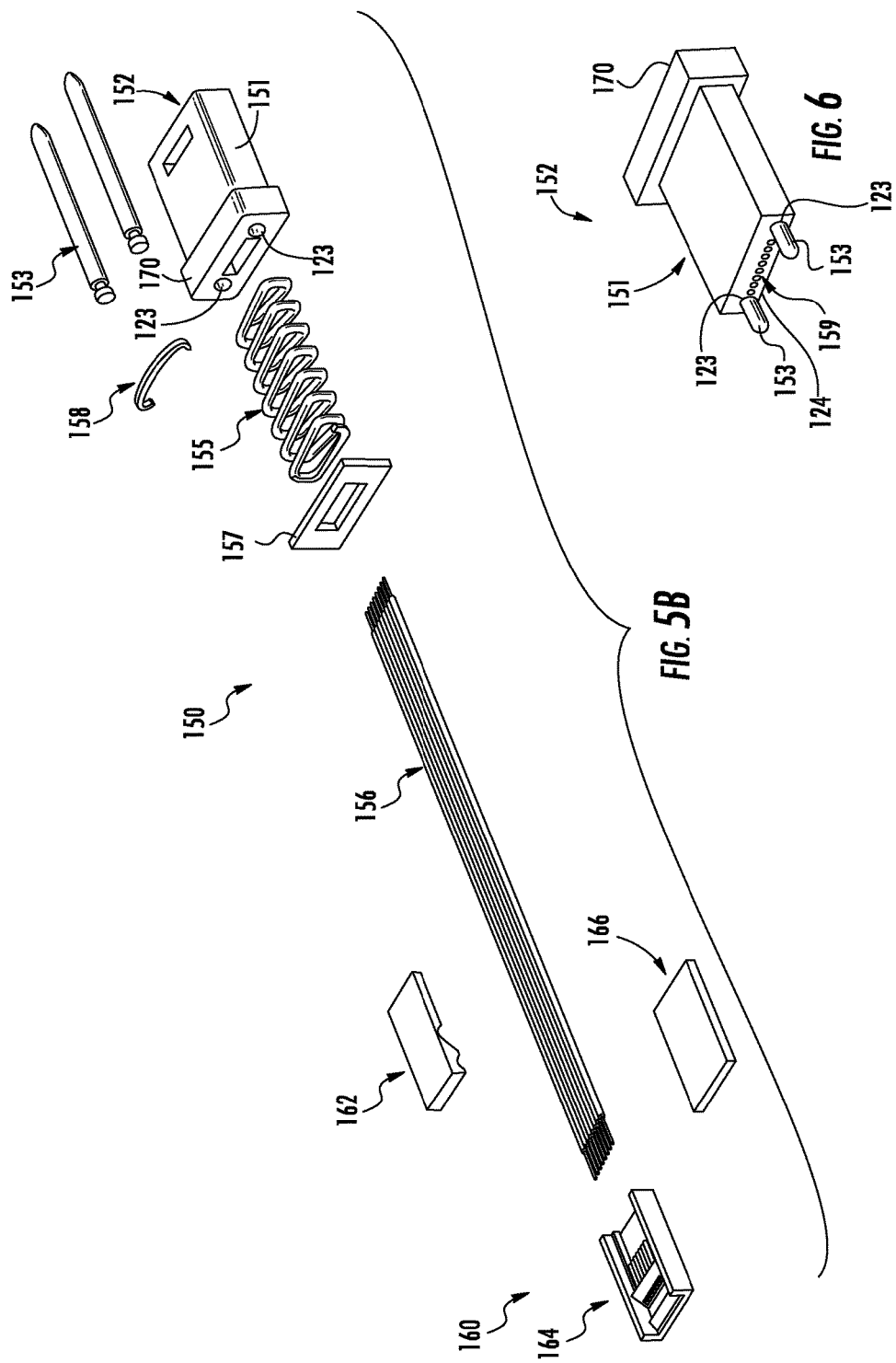

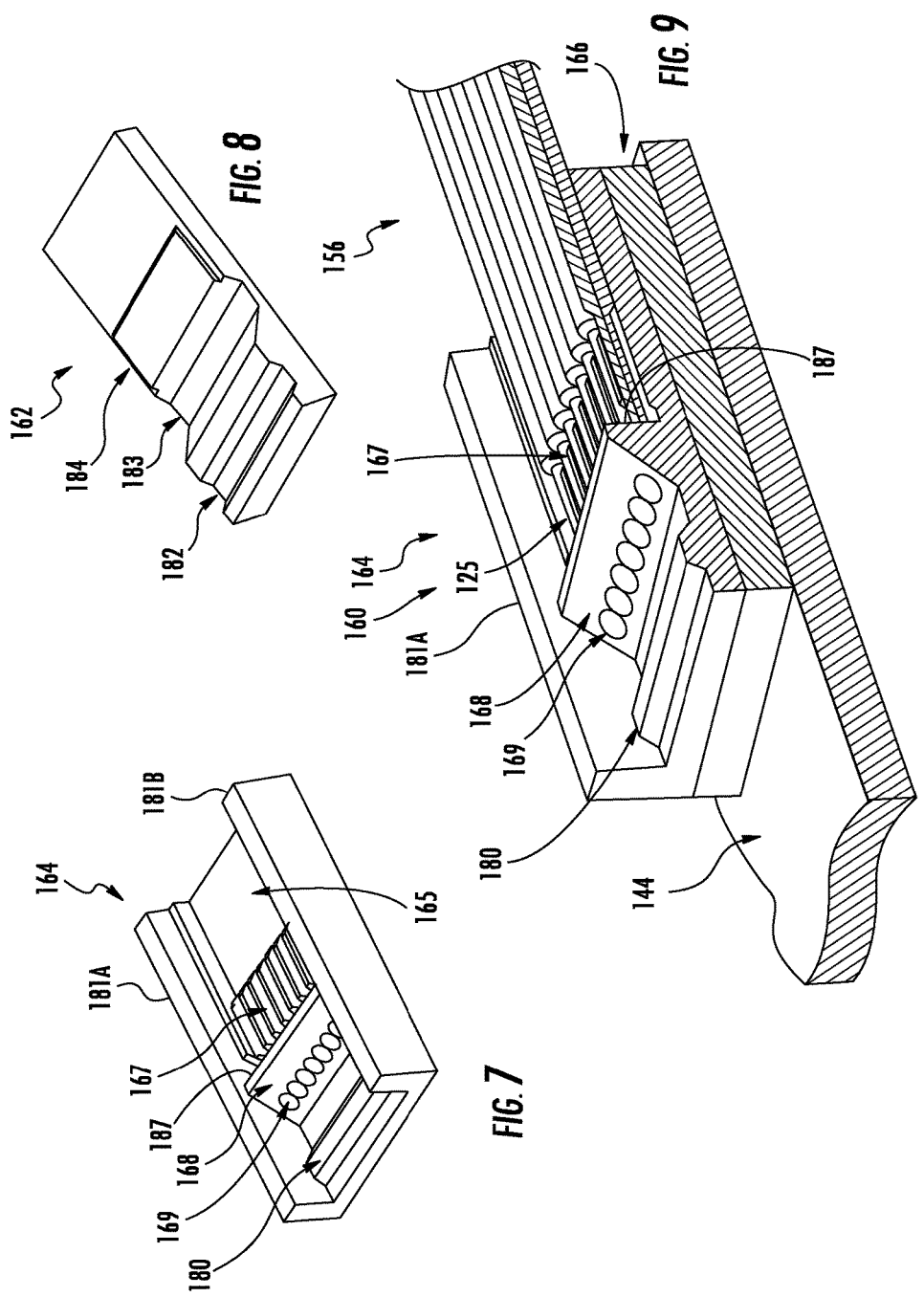

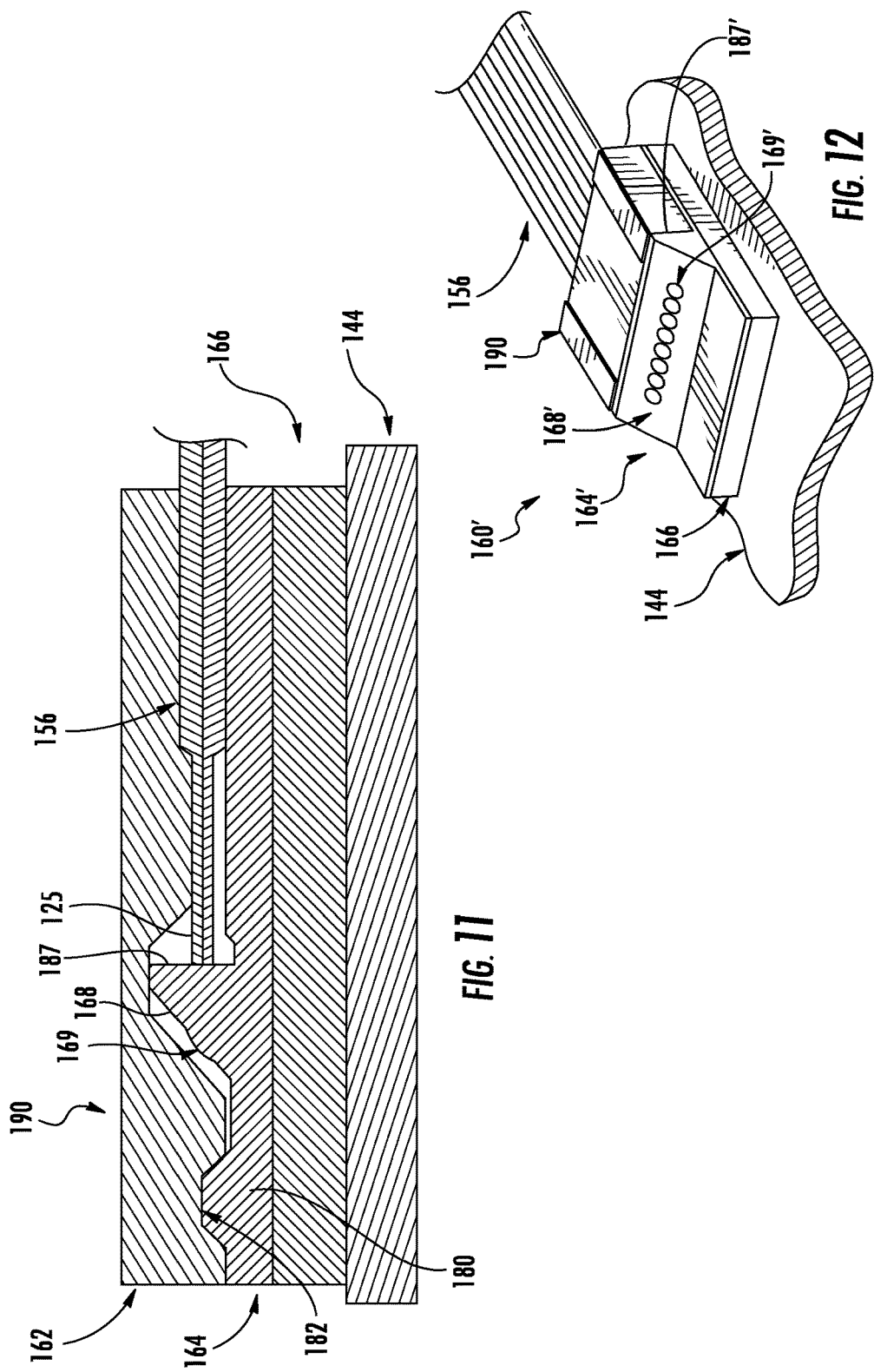

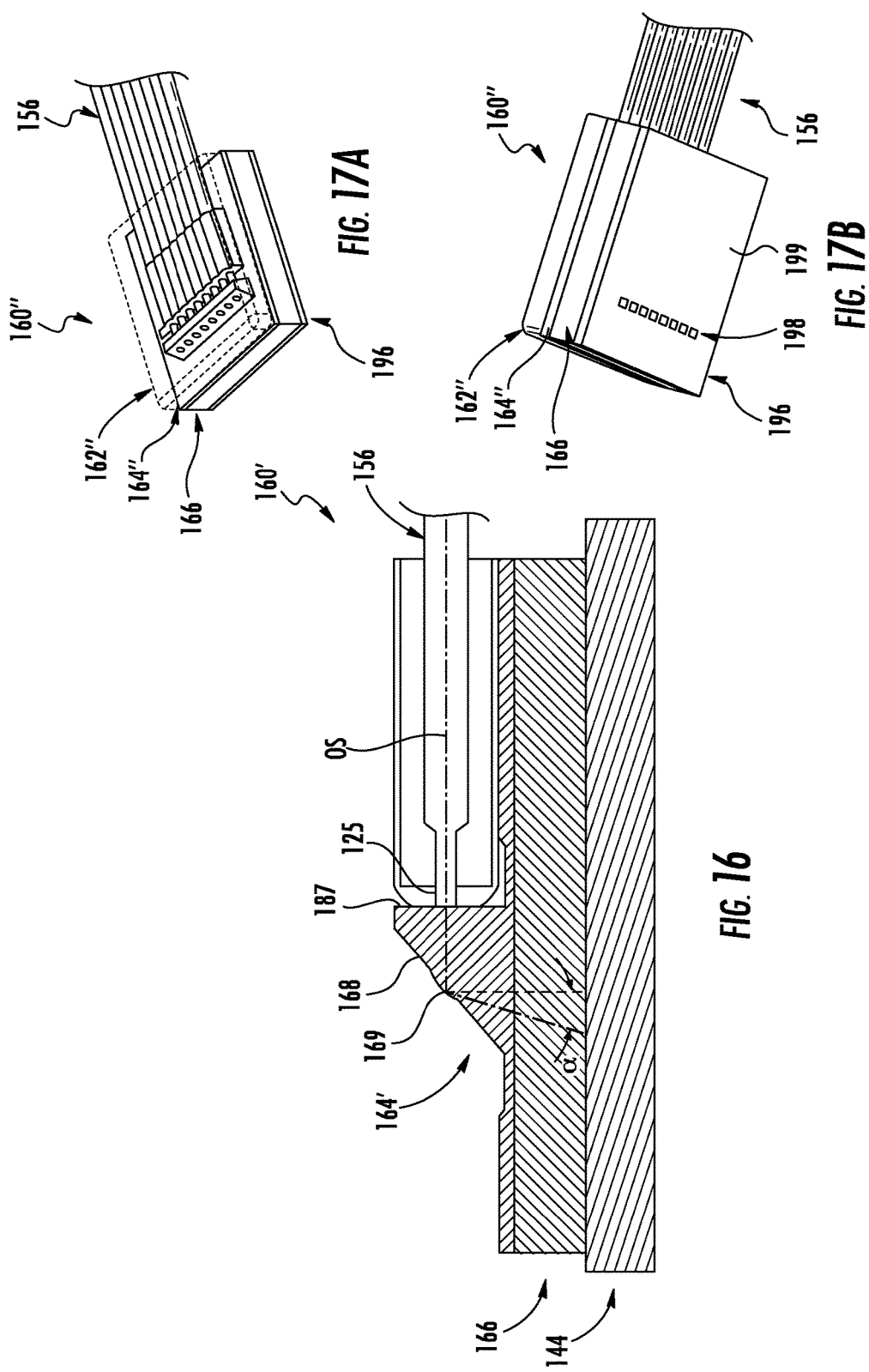

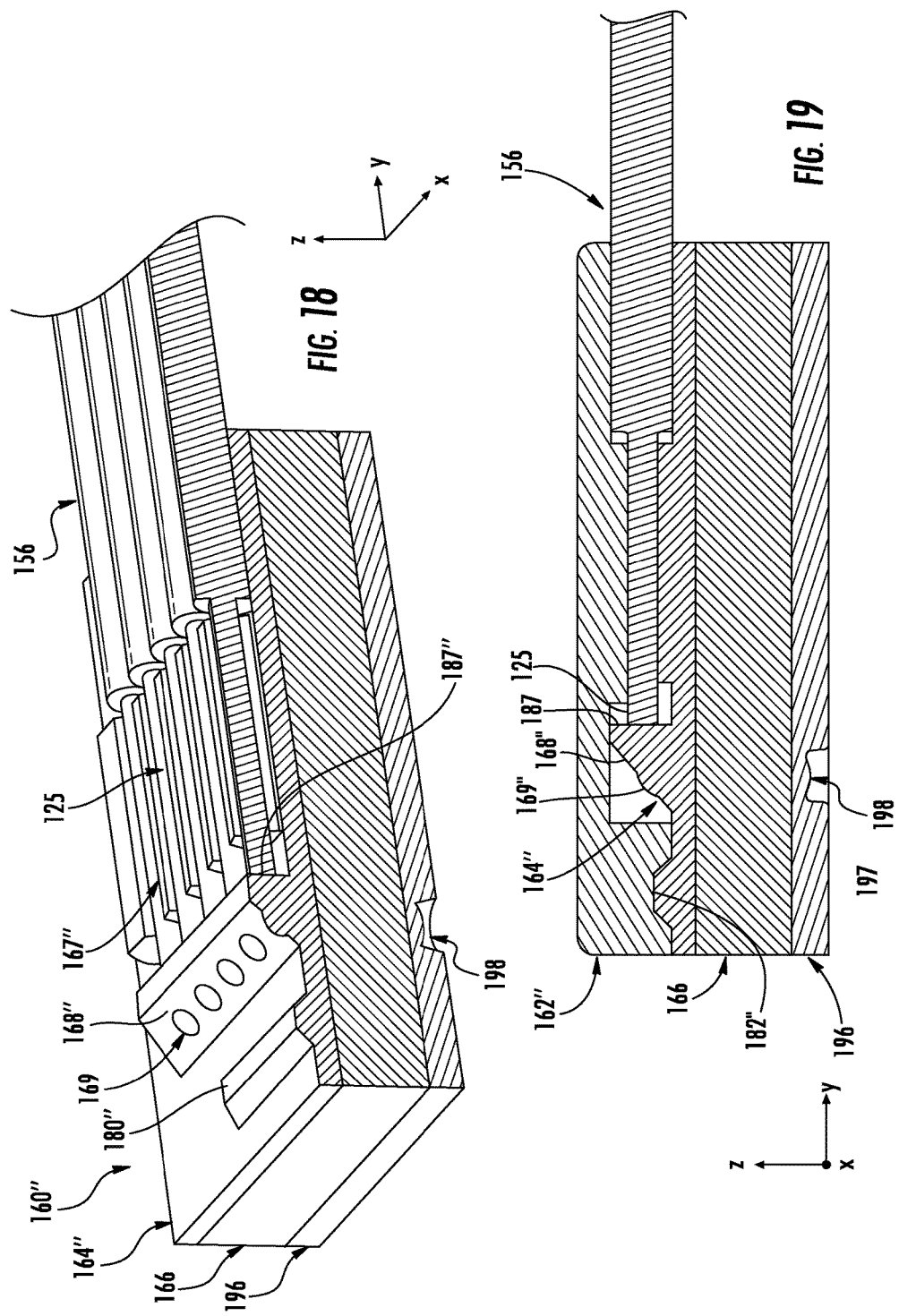

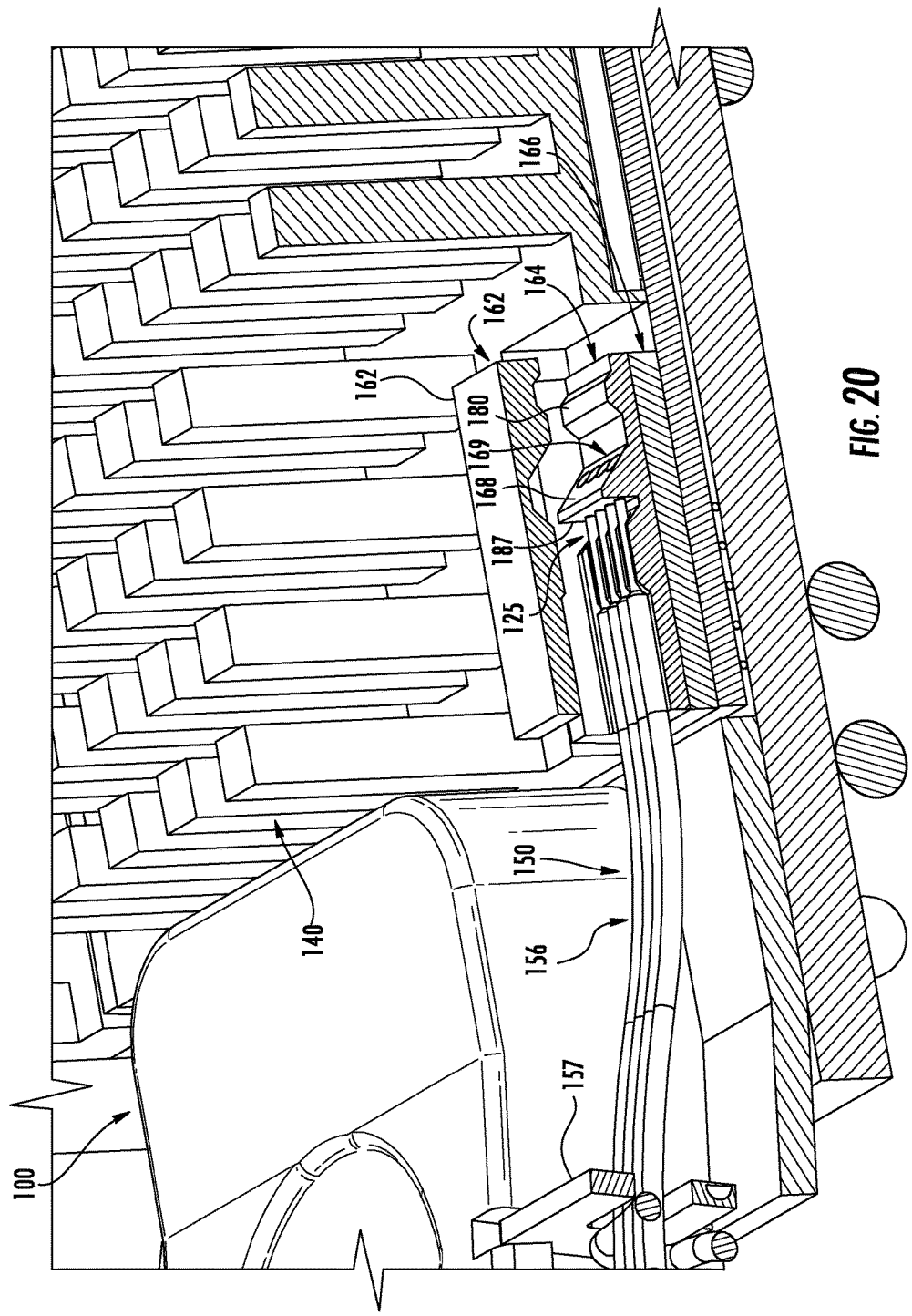

OPTICAL COUPLING ASSEMBLIES FOR COUPLING OPTICAL CABLES TO SILICON-BASED LASER SOURCES

CROSS-REFERENCE TO RELATED APPLICATIONS

This application claims the benefit of priority under 35 U.S.C. § 119 of U.S. Provisional Patent Application No. 62/114,753, filed on Feb. 11, 2015, the content of which is relied upon and incorporated herein by reference in its entirety.

BACKGROUND

The present disclosure generally relates to high-bandwidth optical communication and, more particularly, to optical coupling assemblies for coupling optical cables to silicon-based laser sources.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases by advanced techniques such as silicon-based laser systems and wavelength division multiplexing, large amounts of data must be electronically transferred from the active devices and associated electronics to electronic components of the computing device (e.g., a data switching device of a data center) for further processing (e.g., up to 100 Gbps per channel). Further, the size of optical transceiver devices (e.g., laser diodes, photodiodes) continues to decrease, which presents challenges in providing proper alignment between the transceiver device and the optical cable assembly to which it is connected. Accordingly, alternative optical coupling assemblies are desired.

SUMMARY

In one embodiment, an optical coupling assembly includes an optical coupling carrier frame and at least one jumper cable assembly. The optical coupling carrier frame includes a frame portion defining an integrated circuit opening operable to receive an integrated circuit assembly, and at least one connector portion extending from the frame portion. The at least one connector portion includes a channel operable to receive an optical connector of an optical cable assembly. The at least one jumper cable assembly is disposed within the at least one connector portion. The at least one jumper cable assembly includes a plurality of jumper optical fibers having a first end and a second end, a jumper ferrule coupled to the first end of the plurality of jumper optical fibers, and an optical turn assembly coupled to the second end of the plurality of jumper optical fibers. The optical turn assembly is operable to optically turn optical signals propagating within the optical turn assembly from a first direction to a second direction.

In another embodiment, an optical assembly includes a main substrate having a first surface and a second surface, an optical substrate having a first surface, a second surface and a plurality of internal waveguides, and an optical coupling carrier frame coupled to the first surface of the optical substrate. The second surface of the optical substrate is electrically coupled to the first surface of the main substrate. The optical coupling carrier frame includes a frame portion defining an integrated circuit opening, and at least one connector portion extending from the frame portion. The at least one connector portion includes a channel operable to receive an optical connector of an optical cable assembly.

In yet another embodiment, an optical coupling carrier frame includes a frame portion defining an integrated circuit opening, and at least one connector portion extending from the frame portion. The at least one connector portion includes a channel operable to receive an optical connector of an optical cable assembly.

In yet another embodiment, a method of assembling an optical assembly includes securing an optical coupling carrier frame of an optical coupling assembly to an optical substrate. The optical coupling carrier frame includes at least one connector portion, and the optical coupling assembly further includes at least one jumper cable assembly disposed within the at least one connector portion. The at least one jumper cable assembly includes a plurality of jumper optical fibers having a first end and a second end, and an optical turn assembly coupled to the second end of the plurality of jumper optical fibers. The optical turn assembly is operable to optically turn optical signals propagating within the optical turn assembly from a first direction to a second direction. The method further includes aligning the optical turn assembly of the at least one jumper cable assembly to a plurality of waveguides within the optical substrate, securing the optical turn assembly of the at least one jumper cable assembly to the optical substrate, and heating the optical assembly in a solder reflow process.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4 is a perspective view of the optical coupling carrier frame depicted in FIG. 3A with a plurality of jumper cable assemblies disposed therein;

FIG. 5A is a perspective view of an example jumper cable assembly according to one or more embodiments described and illustrated herein;

FIG. 5B is an exploded, perspective view of the example jumper cable assembly depicted in FIG. 5A;

FIG. 6 is a perspective view of an example jumper ferrule of the example jumper cable assembly depicted in FIG. 5A;

FIG. 7 is a perspective view of an example optical turn module of the example jumper cable assembly depicted in FIG. 5A according to one or more embodiments described and illustrated herein;

FIG. 8 is a perspective view of an underside of a cap of the example jumper cable assembly depicted in FIG. 5A according to one or more embodiments described and illustrated herein;

FIG. 9 is a perspective, cross sectional view of an optical turn assembly of the jumper cable assembly depicted in FIG. 5A shown without the cap according to one or more embodiments described and illustrated herein;

FIG. 11 is a cross sectional view of an assembled optical turn assembly of the jumper cable assembly depicted in FIG. 5A;

FIG. 12 is a perspective view of an optical turn assembly including an optical turn ferrule according to one or more embodiments described and illustrated herein;

FIG. 16 is a cross sectional view of the optical turn assembly depicted in FIG. 12;

FIG. 17A is a top-down perspective view of an optical turn assembly with a lens substrate according to one or more embodiments described and illustrated herein;

FIG. 17B is a bottom-up perspective view of the optical turn assembly depicted in FIG. 17A;

FIG. 18 is a cross sectional, perspective view of the optical turn assembly depicted in FIG. 17A;

FIG. 19 is a cross sectional view of the optical turn assembly depicted in FIG. 17A;

FIG. 20 is a close-up, cross sectional view of an optical turn assembly of a jumper cable assembly coupled to an optical substrate according to one or more embodiments described and illustrated herein;

DETAILED DESCRIPTION

Embodiments are directed to optical coupling assemblies for coupling optical cable assemblies to silicon laser-based, high-bandwidth optical transceiver devices. More specifically, embodiments utilize an optical coupling carrier frame configured to maintain a plurality of jumper cable assemblies. The jumper cable assembly has a jumper ferrule at one end that is configured to mate with an optical cable assembly, and an optical turn module that is permanently bonded on an optical substrate and is precision-aligned with silicon photonics inputs/outputs. The optical turn module utilizes wafer-level optics to provide a lensed total internal reflection surface for optically turning optical signals toward and away from the optical substrate, as well as to provide a fiber alignment structure. The optical coupling assemblies described herein are capable of going through a solder reflow process without damage or loss of alignment with respect to the silicon photonics devices. Various embodiments of optical coupling assemblies are described in detail below.

Figure 1A:
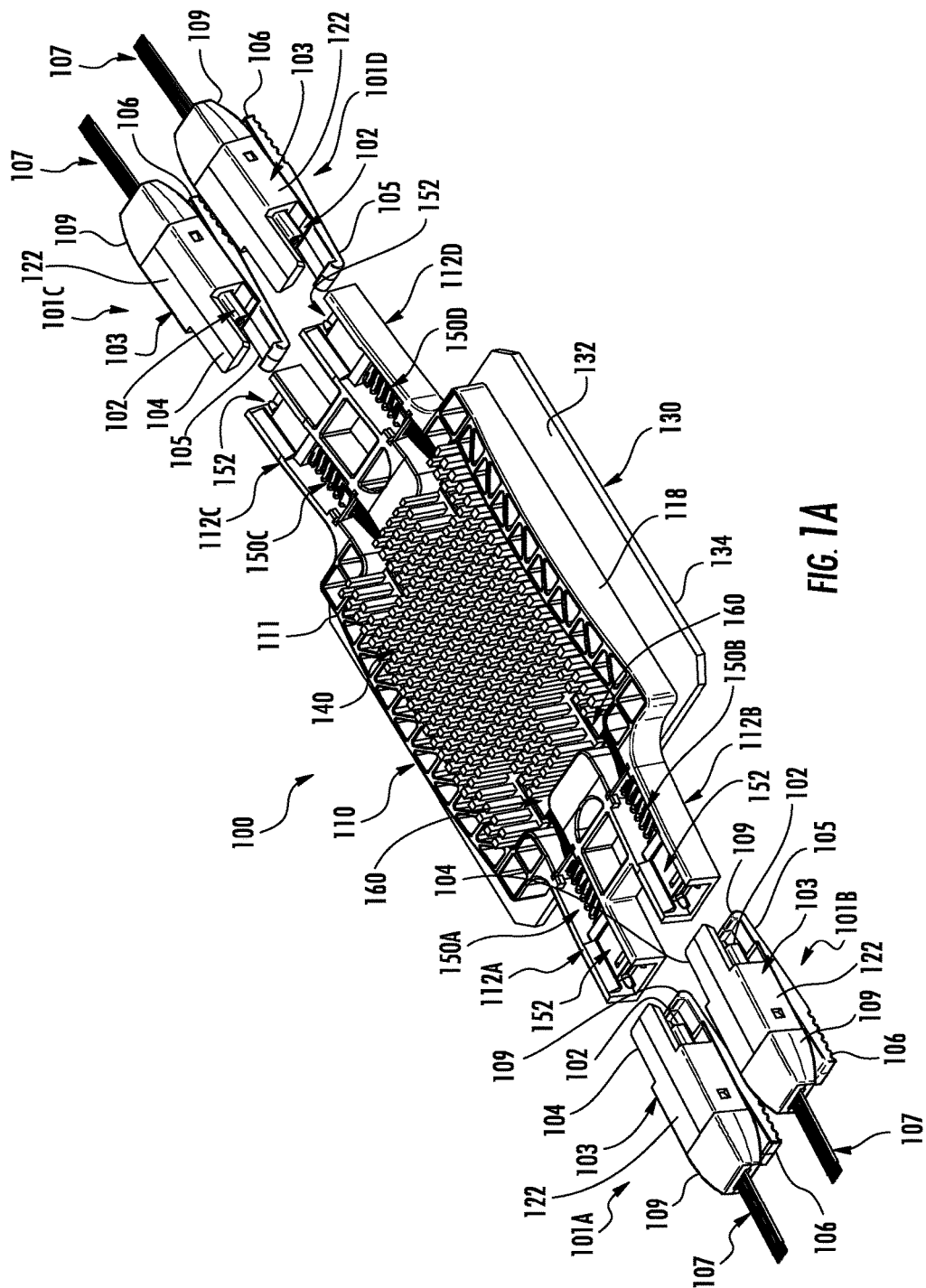
FIG. 1A is a top-down perspective view of an example optical assembly comprising an example optical coupling assembly according to one or more embodiments described and illustrated herein.
Figure 1B:
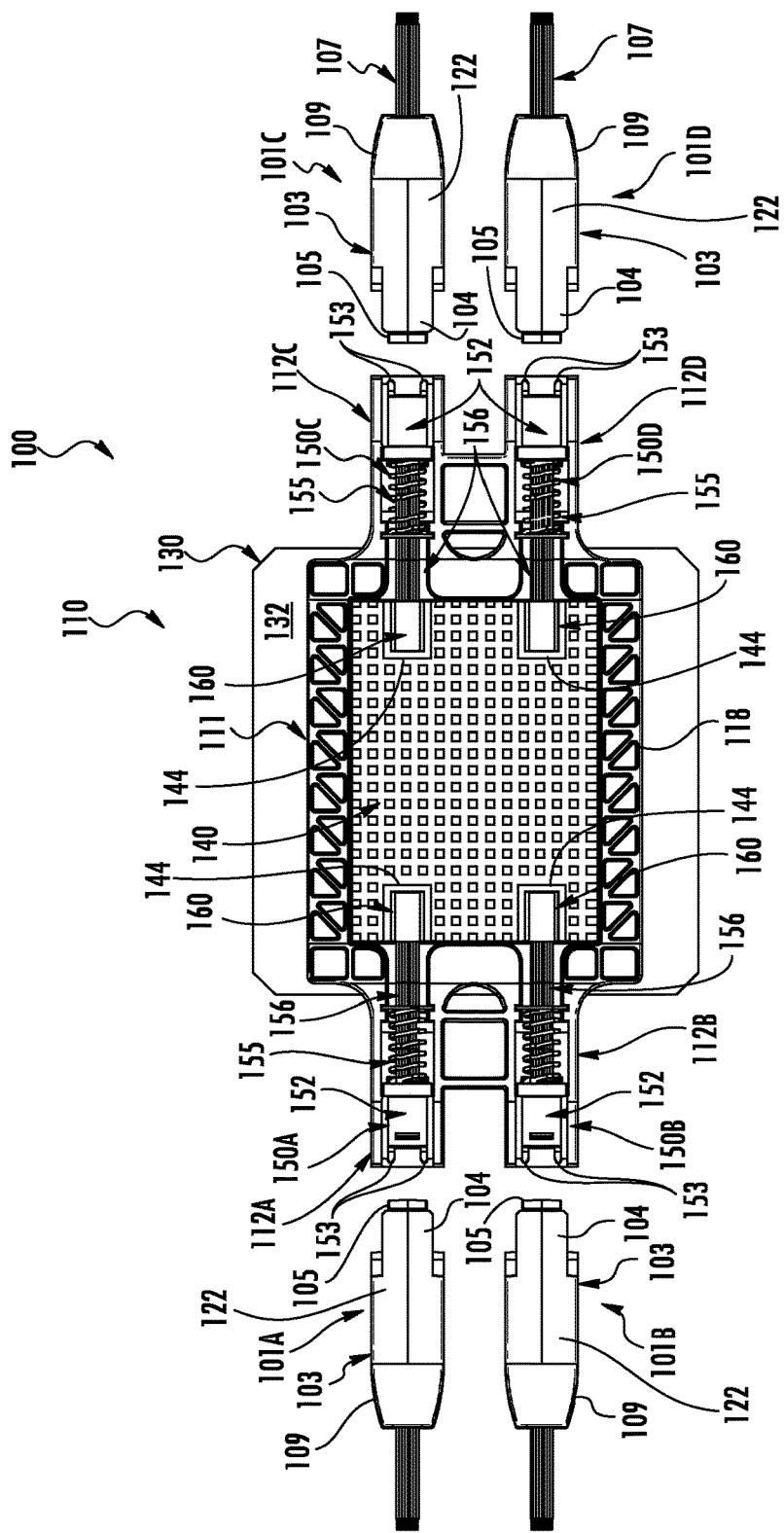
FIG. 1B is a top view of the example optical assembly depicted in FIG. 1A.
Figure 1C:
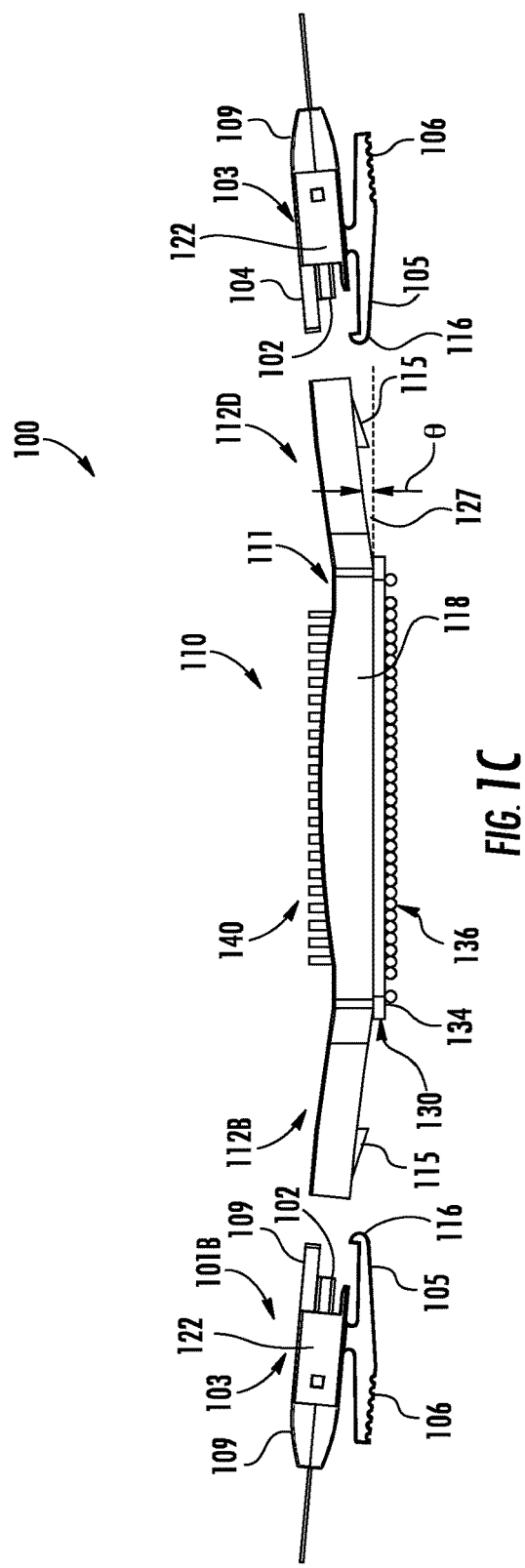
FIG. 1C is a side elevation view of the example optical assembly depicted in FIG. 1A.
Figure 1D:
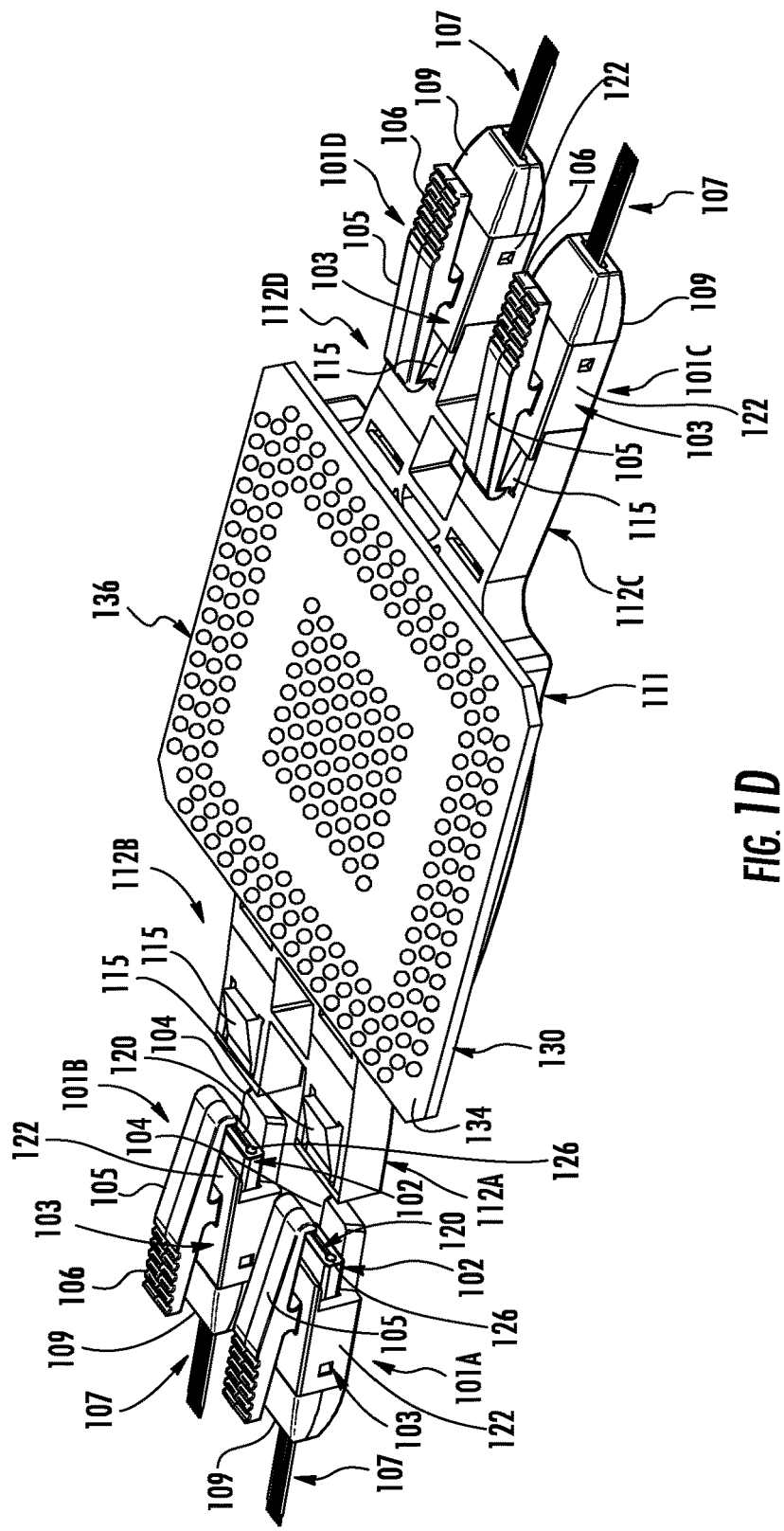
FIG. 1D is a bottom-up perspective view of the example optical assembly depicted in FIG. 1A.
Figure 2:
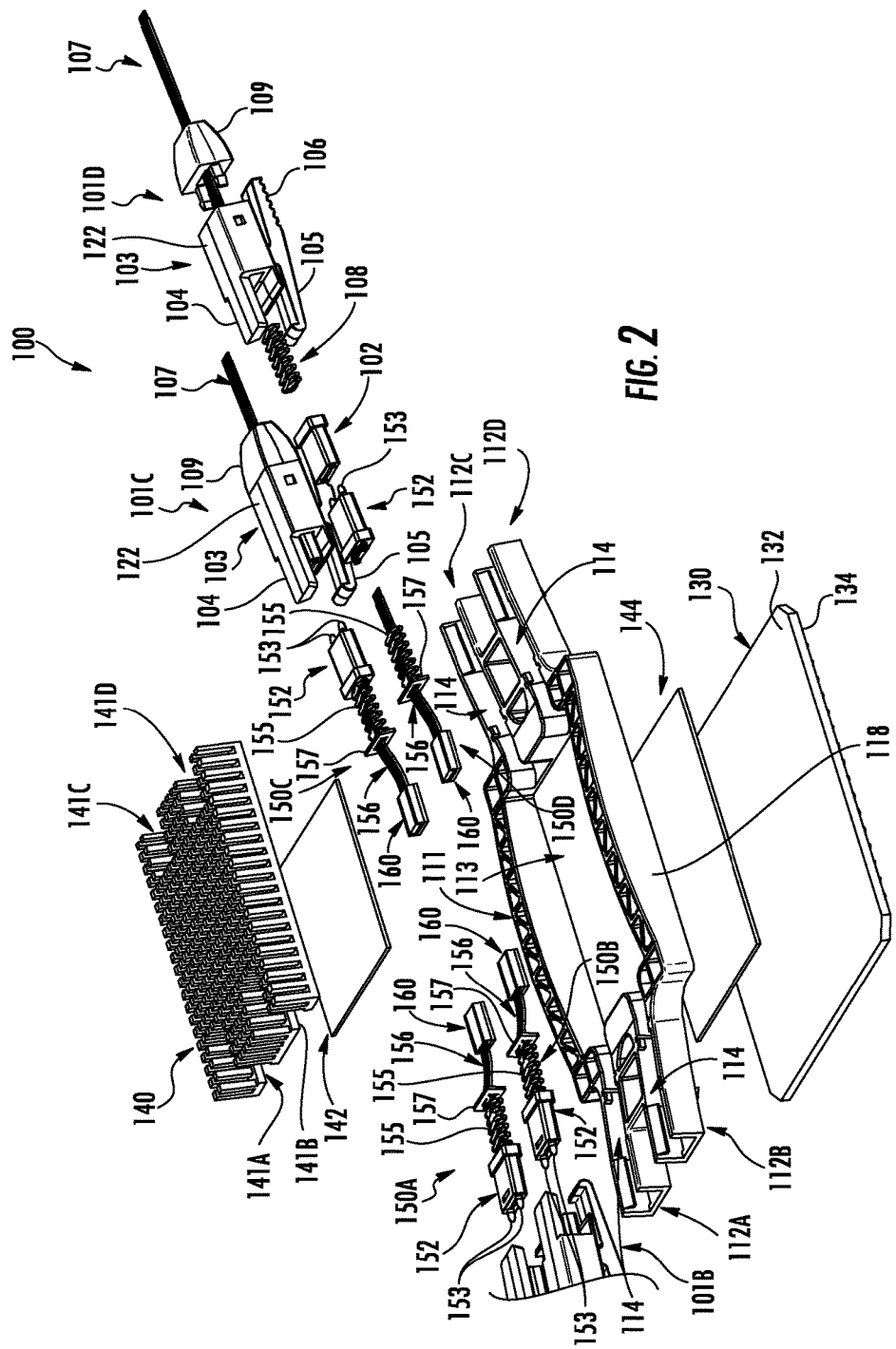
FIG. 2 is an exploded perspective view of the example optical assembly depicted in FIG. 1A.

Referring now to FIGS. 1A-1D and 2, an example optical assembly 100 is illustrated. FIG. 1A is a top-down, perspective view of the optical assembly 100, FIG. 1B is a top view off the optical assembly 100, FIG. 1C is an elevation view of the optical assembly 100, and FIG. 1D is a bottom-up perspective view of the optical assembly 100. FIG. 2 is an exploded view of the example optical assembly 100 depicted in FIG. 1A.

Referring generally to FIGS. 1A-1D and 2, the optical assembly 100 generally comprises an optical coupling assembly 110 mounted onto a main substrate 130. The optical assembly 100 acts as an optical transceiver device capable of converting electrical signals into optical signals for transmission across optical fibers, and of converting optical signals from the optical fibers into electrical signals. The main substrate 130 may be any suitable substrate, such as a printed circuit board substrate (e.g., FR-4). As shown in FIG. 1D, a second surface 134 of the main substrate 130 may include electrical connections 136 to electrically couple the optical assembly 100 to a larger circuit assembly, such as a mother board of an optical communications system. The illustrated electrical connections 136 are depicted as a ball grid array ("BGA"). However, it should be understood that other types of electrical connections may be utilized.

As shown in FIG. 2, the example optical assembly 100 further comprises an optical substrate 144, an optical integrated circuit 142, and a cooling assembly 140. The optical substrate 144 is electrically coupled to a first surface 132 of the main substrate 130, such as by a BGA electrical connection or by other electrical connection means. The optical integrated circuit 142 is electrically coupled to a surface of the optical substrate 144. As described in more detail below, the optical integrated circuit 142 may convert optical signals into electrical signals, and vice versa, to enable high-speed optical communication. In some embodiments, the optical integrated circuit 142 may be electrically coupled to the optical substrate 144 and the main substrate 130 by way of through-silicon vias ("TSVs"). Other electrical connection means may also be provided.

The optical integrated circuit 142 may be configured as any silicon photonics integrated circuit chip, such as a hybrid laser silicon chip or a Raman laser silicon chip, for example. The optical integrated circuit 142 may include one or more optical sources (not shown) that produce one or more laser beams operating as transmitted optical signals. Additionally or alternatively, the optical integrated circuit 142 may include one or more photo detectors operable to receive one or more laser beams operating as received optical signals and, along with additional electrical components, convert the one or more laser beams into electrical signals. In this manner, the optical integrated circuit 142 operates as a silicon-based electrical-to-optical and optical-to-electrical transceiver. The optical integrated circuit 142 may perform other functionalities, such as analog to digital conversion, data buffering and storage, retiming, signal amplification, signal equalization, signal pre-emphasis, and the like.

In embodiments, the optical substrate 144 acts as an interposer passing electrical signals (e.g., by TSVs) between the optical integrated circuit 142 and the main substrate 130. As described in more detail below, the optical substrate 144 is also configured to route optical signals within the bulk of the optical substrate 144, such as by internal waveguides 146 (see FIG. 15). The optical substrate 144 is configured to pass optical signals between the optical integrated circuit 142 and the optical coupling assembly 110. In one embodiment, the optical substrate 144 is fabricated from silicon. Other materials may also be utilized for the optical substrate 144.

Referring once again to FIGS. 1A-1D and 2, in the illustrated embodiment, a cooling assembly 140 is thermally coupled to the optical integrated circuit 142. Although the cooling assembly 140 depicted in FIGS. 1A-1D and 2 is illustrated as a finned heat sink, embodiments are not limited thereto. For example, the cooling assembly 140 may be configured as a liquid-cooled cooling device or any other cooling device capable of removing heat generated by the optical integrated circuit 142. It should also be understood that embodiments are not limited to the heat sink configuration of the cooling assembly 140 illustrated in FIGS. 1A-1D and 2. In other embodiments, no cooling assembly 140 is provided.

Figure 3A:
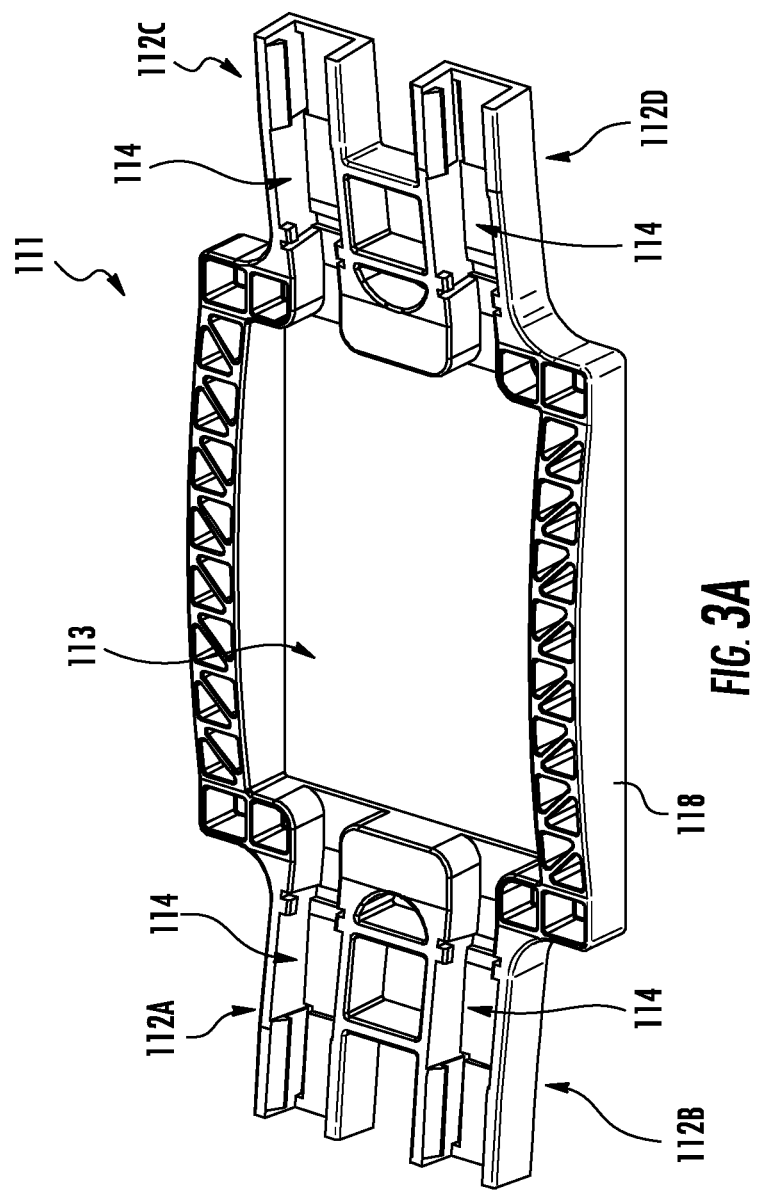
FIG. 3A is a top-down perspective view of an optical coupling carrier frame of the example optical assembly depicted in FIG. 1A.
Figure 3B:
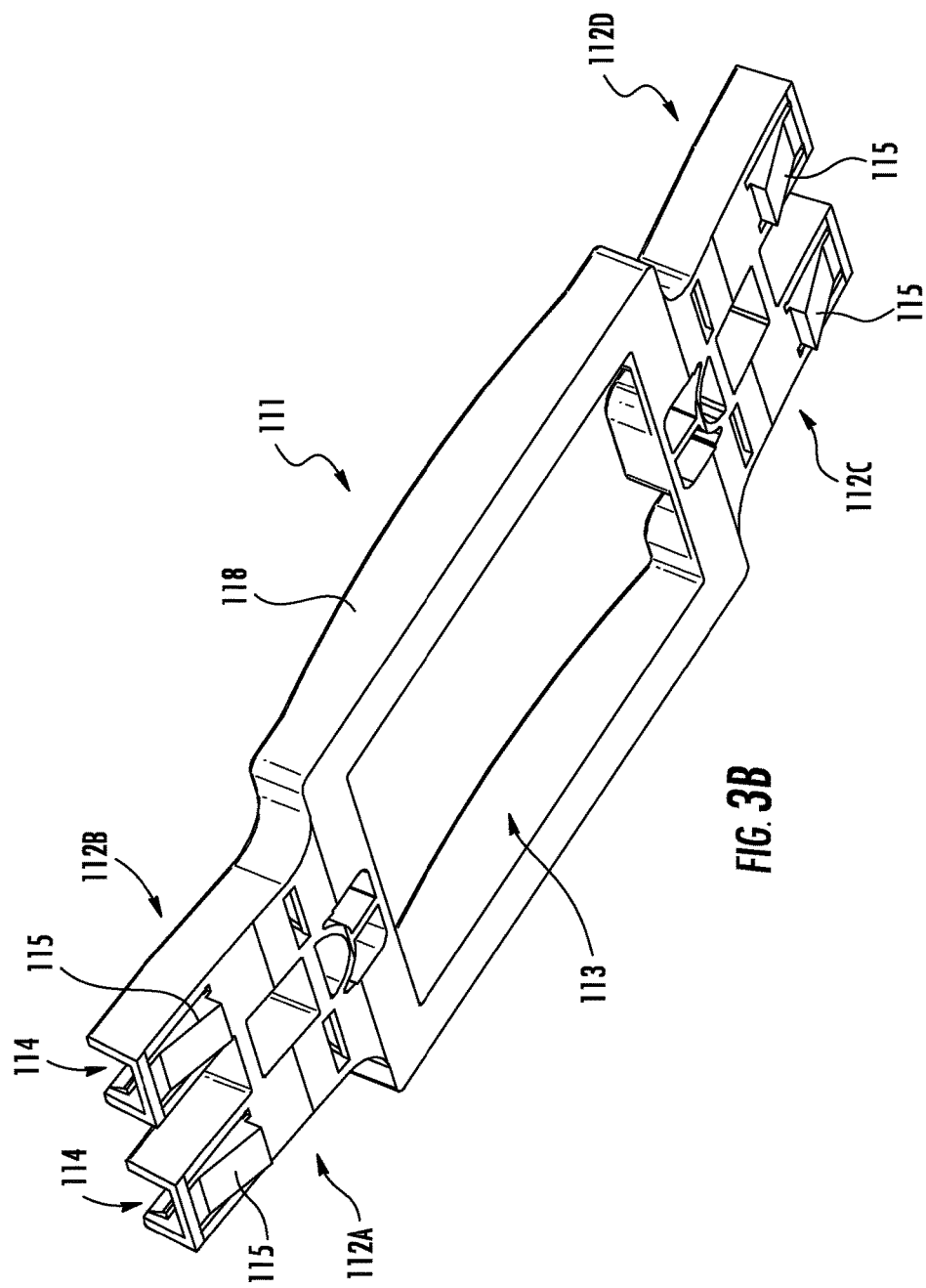
FIG. 3B is a bottom-up perspective view of an optical coupling carrier frame of the example optical assembly depicted in FIG. 1A.

The illustrated optical coupling assembly 110 comprises an optical coupling carrier frame 111. FIGS. 3A and 3B illustrate the optical coupling carrier frame 111 of FIGS. 1A-1D and 2 depicted in isolation. FIG. 3A is a top-down perspective view of the optical coupling carrier frame 111, while FIG. 3B is a bottom-up perspective view of the optical coupling carrier frame 111. Referring to FIGS. 3A and 3B (in conjunction with FIGS. 1A-1D and 2), the optical coupling assembly 110 generally comprises an optical coupling carrier frame 111 having a frame portion 118 and at least one connector portion (e.g., first connector portion 112A, second connector portion 112B, third connector portion 112C, and fourth connector portion 112D,) extending from the frame portion 118. As described in more detail below, the at least one connector portion is configured to mate with an optical connector (e.g., optical connector 103 as shown in FIG. 1A) of at least one optical cable assembly (e.g., first optical cable assembly 101A as shown in FIG. 1A) to facilitate optical communication between the at least one optical cable assembly and the optical assembly 100.

The optical coupling carrier frame 111 is fabricated from a material having a low coefficient of thermal expansion ("CTE"). In embodiments, the material of the optical coupling carrier frame may have has a CTE between about 6 ppm/° C. and about 10 ppm/° C. The material may be a highly filled thermoplastic, for example, polyphenylene sulfide, or a highly filled thermosetting epoxy, for example, Plascon 2929b and the like.

In the illustrated embodiment, the frame portion 118 is rectangular in shape. However, embodiments are not limited thereto. For example, the frame portion 118 may be circular or elliptical in shape in other embodiments.

The frame portion 118 defines an integrated circuit opening 113. The optical coupling assembly 110 is mounted onto the main substrate 130 at the optical coupling carrier frame 111 by any technique, such as by mechanical fasteners, mechanical locking features, or by a suitable adhesive. Briefly referring to FIG. 2, the optical substrate 144, the optical integrated circuit 142, and the cooling assembly 140 are disposed on the main substrate 130 within the integrated circuit opening 113 such that they are surrounded by the frame portion 118 of the optical coupling carrier frame 111.

The first and second connector portions 112A, 112B extend from a first edge of the frame portion 118, while the third and fourth connector portions 112C, 112D extend from a second edge of the frame portion 118 that is opposite from the first edge. It should be understood that more or fewer than four connector portions may be provided. It should also be understood that the connector portions may be arranged around the frame portion 118 in a configuration other than the configuration depicted in FIGS. 1A-1D, 2, 3A and 3B.

In the illustrated embodiment, each connector portion 112A-112D has a plurality of walls and a floor defining a channel 114. It should be understood that embodiments are not limited to the connector portions 112A-112D illustrated in the figures, and that other configurations are also possible. The connector portions 112A-112D are configured to be removably coupled to optical connectors 103 of optical cable assemblies, such as first optical cable assembly 101A, second optical cable assembly 101B, third optical cable assembly 101C, and fourth optical cable assembly 101D. The configuration of the connector portions may depend on the style of the optical connectors 103.

Referring specifically to FIG. 3B, each connector portion 112A-112D comprises an engagement feature 115 operable to engage an optical connector 103, as described in more detail below. The engagement feature 115 in the illustrated embodiment is configured as a raised tab on an underside surface of the first through fourth connector portions 112A-112B.

Referring to FIG. 2, the example optical connectors 103 have a body 122 comprising an upper feature 104, a fiber securing portion 109 that snaps into the body and provides strain resistance for the plurality of cable optical fibers 107, and a locking arm 105 that mates with the connector portions 112A-112D of the optical coupling carrier frame 111. In the illustrated embodiment, the locking arm 105 is pivotably attached to the body 122. The locking arm 105 engages the engagement feature 115 when the optical connector 103 is mated with one of the first through fourth connector portions 112A-112D. The optical connector 103 is released from the engagement feature 115 by pressing on release tab 106 of the optical connector 103 and pulling the optical connector 103 away from the connector portion of the optical coupling carrier frame 111.

Referring now to FIG. 1C, in the illustrated embodiment, the first through fourth connector portions 112A-112D are angled by angle θ with respect to a plane 127 defined by a lower surface of the optical coupling carrier frame 111. The angle θ may allow easier access to the first through fourth connector portions 112A-112D for engaging and disengaging the first through fourth optical cable assemblies 101A-101D. In other embodiments, the first through fourth connector portions 112A-112D are not angled.

Referring now to FIG. 4 in conjunction with FIGS. 1A-1D and 2, an assembled optical coupling assembly 110 is depicted in isolation. In addition to the optical coupling carrier frame 111, the optical coupling assembly 110 further comprises at least one jumper cable assembly, such as a first jumper cable assembly 150A disposed within the channel 114 of the first connector portion 112A, a second jumper cable assembly 150B disposed within the channel 114 the second connector portion 112B, a third jumper cable assembly 150C disposed within the channel of the third connector portion 112C, and a fourth jumper cable assembly 150D disposed within the channel of the fourth connector portion 112D. The first through fourth jumper cable assemblies 150A-150D act as optical tethers and are configured to pass optical signals between the optical integrated circuit 142 and the first through fourth optical cable assemblies 101A-101D.

FIG. 5A depicts a perspective view of an example jumper cable assembly 150 according to one embodiment, while FIG. 5B depicts an exploded view of the jumper cable assembly 150 depicted in FIG. 5B. The example jumper cable assembly 150 comprises a plurality of jumper optical fibers 156, a jumper ferrule 152 positioned on a first end of the plurality of jumper optical fibers 156, and an optical turn assembly 160 positioned on a second end of the plurality of jumper optical fibers 156.

The plurality of jumper optical fibers 156 is illustrated as ribbonized optical fibers. However, embodiments are not limited thereto. In one embodiment, each optical fiber of the plurality of jumper optical fibers 156 is a single mode, single core fiber surrounded by one or more additional layers (e.g., a jacket layer). The optical fibers may also be multi-core in other embodiments. Any number of optical fibers may be utilized.

The first end of the plurality of jumper optical fibers 156 is disposed within the jumper ferrule 152, which is also illustrated in FIG. 6. The jumper ferrule 152 is configured to be mechanically and optically coupled to a connector ferrule 102 of an optical connector 103 (see FIG. 1D). The example jumper ferrule 152 has a body portion 151 and a flange portion 170. The individual optical fibers are disposed within bores (not shown) of the jumper ferrule 152. The plurality of jumper optical fibers 156 may be secured within the jumper ferrule 152 by an adhesive, for example.

The bores may terminate at lens elements 159 at a coupling face 124 of the jumper ferrule 152. The lens elements may 159 be diffractive lenses formed in the coupling face 124 of the jumper ferrule 152 during the molding process, for example. Optical coupling elements other than the illustrated lens elements 159 may be utilized. For example, optical coupling elements configured as gradient-index refractive lenses may be disposed within the bores. In other embodiments, there are no lens elements provided in or on the coupling face 124. Rather, the ends of the plurality of jumper optical fibers 156 are exposed at the coupling face (see FIGS. 23 and 24, described below).

In the example embodiment, alignment pins 153 are disposed within alignment pin bores 123 of the jumper ferrule 152. The alignment pins 153 are configured to be inserted into corresponding alignment bores 126 of the connector ferrule 102 when an optical connector 103 is connected to a connector portion (e.g., the first connector portion 112A) of the optical coupling carrier frame 111. The alignment pins 153 provide alignment between the plurality of lens elements 159 (and therefore the plurality of jumper optical fibers 156) within the jumper ferrule 152 and a plurality of lens elements 120 (and therefore the plurality of cable optical fibers 107) of the connector ferrule 102.

Referring to FIGS. 5A and 5B, in the illustrated embodiment, the jumper cable assembly 150 includes a plate 157 and a bias member 155 disposed around the plurality of jumper optical fibers 156. The bias member 155, which is disposed between the plate 157 and the jumper ferrule 152, may be provided to provide a spring force on the jumper ferrule 152 to ensure that optical coupling is maintained between the jumper ferrule 152 and the connector ferrule 102. The plate 157 provides a rear surface for the bias member 155 (see FIG. 4). In other embodiments, a plate 157 and/or a bias member 155 is not provided.

The optical turn assembly 160 is provided on a second end of the plurality of jumper optical fibers 156. Referring briefly to FIG. 1B, the optical turn assemblies 160 are coupled to the optical substrate 144. The optical turn assembly 160 is configured to optically turn optical signals propagating to and from the plurality of jumper optical fibers 156. Accordingly, optical signals propagating from the optical substrate 144 are turned by the optical turn assembly 160 such that they are directed into the plurality of jumper optical fibers 156. Similarly, optical signals propagating from the plurality of jumper optical fibers 156 are turned by the optical turn assembly 160 toward the optical substrate 144. The optical turn assembly 160 may be any assembly or component capable of optical turning the optical signals between the optical substrate 144 and the plurality of jumper optical fibers 156.

Referring once again to FIGS. 5A and 5B, an example optical turn assembly is illustrated. In the illustrated embodiment, the optical turn assembly 160 comprises an optical turn module 164, a cap 162 and a base substrate 166. In some embodiments, the base substrate 166 is made of glass or another material that is optically transmissive to the optical signals. The optical turn module 164 may be fabricated from an optical transmissive polymer that is applied to the base substrate 166. As an example and not a limitation, the features of the optical turn module 164 may be imprinted into the transmission polymer on the base substrate 166.

Figure 10:
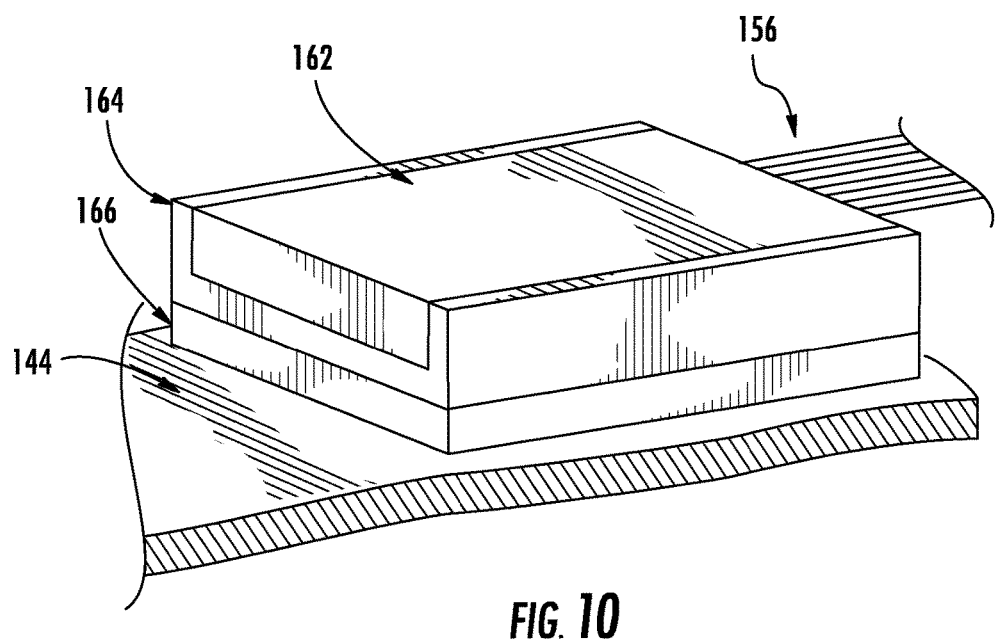
FIG. 10 is a close-up perspective view of an assembled optical turn assembly of the jumper cable assembly depicted in FIG. 5A.

FIG. 7 depicts the example optical turn module 164 illustrated in FIGS. 5A and 5B. FIG. 8 depicts an underside surface of the cap 162 depicted in FIGS. 5A and 5B. FIG. 9 depicts the example optical turn module 164, the plurality of jumper optical fibers 156, the base substrate 166 and the optical substrate 144 in cross section. FIG. 10 is a close-up view of the assembled optical turn assembly 160 illustrated in FIGS. 5A and 5B, while FIG. 11 is a cross sectional view of the assembled optical turn assembly 160 depicted in FIG. 11.

Referring generally to FIGS. 7-11, the illustrated optical turn module 164 comprises first and second walls 181A, 181B with features disposed therebetween. The first and second walls 181A, 181B define a fiber receiving portion 165 wherein the plurality of jumper optical fibers 156 is disposed.

The optical turn module 164 includes a plurality of fiber receiving grooves 167 in which a stripped portion 125 of the plurality of jumper optical fibers 156 is positioned. The optical turn module 164 further includes a datum surface 187. As shown in FIGS. 9 and 11, ends of the plurality of jumper optical fibers 156 are adjacent to the datum surface

187 such that they contact, or nearly contact, the datum surface 187. The datum surface 187 is orthogonal to the plurality of fiber receiving grooves 167.

The optical turn module 164 further includes a total internal reflection surface 168 that is transverse to the datum surface 187 such that it slopes away from an upper portion of the datum surface 187. The optical turn module 164 is fabricated from a material that is optically transmissive to the wavelength of the optical signals. Referring specifically to FIG. 11, the index of refraction difference between the material of the optical turn module 164 and air, as well as the angle of the total internal reflection surface 168, causes the optical signals to be optically turned within the optical turn module 164 by total internal reflection.

The total internal reflection surface 168 further includes a plurality of lens elements 169 aligned with the fiber receiving grooves 167 (and therefore the plurality of jumper optical fibers 156 disposed therein). The plurality of lens elements 169 conditions the optical signals passing therethrough. As used herein, the term "conditions" means that the plurality of lens elements converge the optical signals for receipt by the optical substrate 144 or the plurality of jumper optical fibers 156. It is noted that the lens elements 169 for focusing optical signals into the plurality of jumper optical fibers 156 may be different from the lens elements 169 for focusing optical signals into the optical substrate 144. In other embodiments, all of the lens elements of the plurality of lens elements 169 are the same for both conditioning the optical signals for receipt by the plurality of jumper optical fibers 156 and for receipt by the optical substrate 144.

The optical substrate 144 may include a plurality of internal silicon grating lenses 147 (see FIG. 15) that converge incoming optical signals from the optical turn module 164, and converge optical signals emitted from the optical substrate 144. It is noted that, in other embodiments, no internal silicon grating lenses are provided in the optical substrate 144. Optical signals exiting the internal silicon grating lenses 147 may converge for a short distance (e.g., 25 μm), but then diverge over the longer distances within the optical path toward the plurality of jumper optical fibers 156. The lens elements 169 and the total internal reflection surface 168 turn the optical signals and converge them at the proper numerical aperture to enter the ends of the optical fibers 156. Conversely, diverging optical signals exiting the optical fibers 156 are turned by the lens elements 169 and the total internal reflection surface 168 to properly enter the internal silicon grating lenses 147.

The illustrated optical turn module 164 further includes an alignment notch 180 for mating with a corresponding alignment groove 182 of the cap 162. As shown in FIG. 8, the cap 162 includes an alignment groove 182 into which the alignment notch 180 of the optical turn module 164 is disposed (see FIG. 11) to align the cap 162 with the optical turn module 164. The cap 162 also includes a groove 183 for receiving the total internal reflection surface 168 and the datum surface 187, and further includes a fiber contacting surface 184 that is configured to contact the stripped portion 125 of the plurality of jumper optical fibers 156 to secure the plurality of jumper optical fibers 156 within the plurality of fiber receiving grooves 167. The cap 162 may be secured to the optical turn module 164 after insertion of the plurality of jumper optical fibers 156 using an index matching adhesive, for example. As described in more detail below, the lower surface of the base substrate 166 is bonded to the optical substrate 144 by an index matching adhesive.

Figure 13:
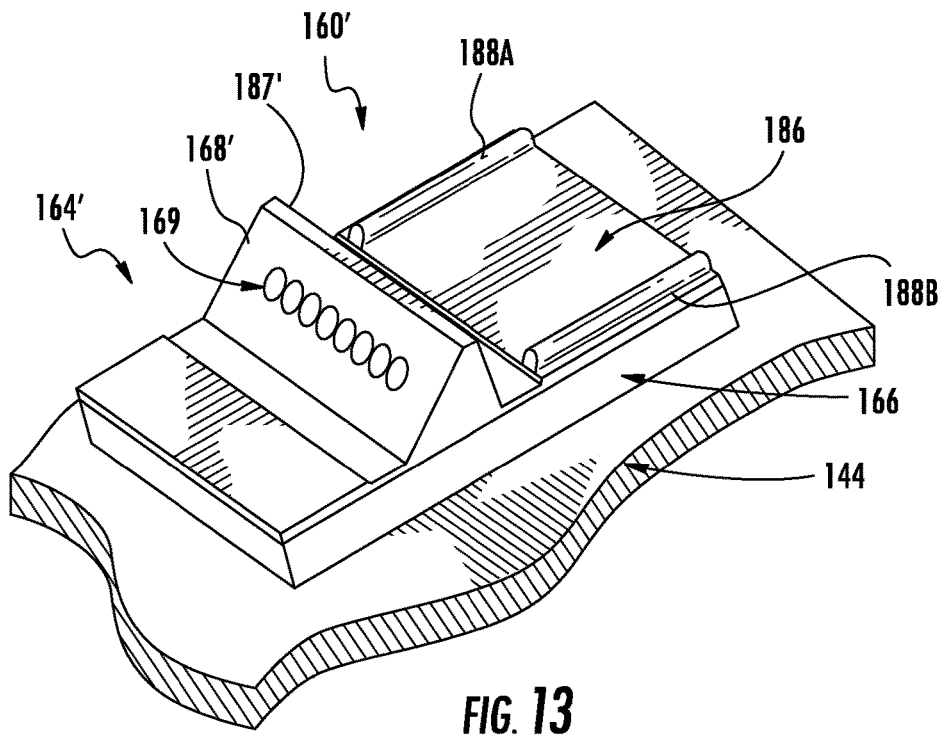
FIG. 13 is a perspective view of the optical turn module assembly depicted in FIG. 12 shown without the optical turn ferrule according to one or more embodiments described and illustrated herein.
Figure 14:
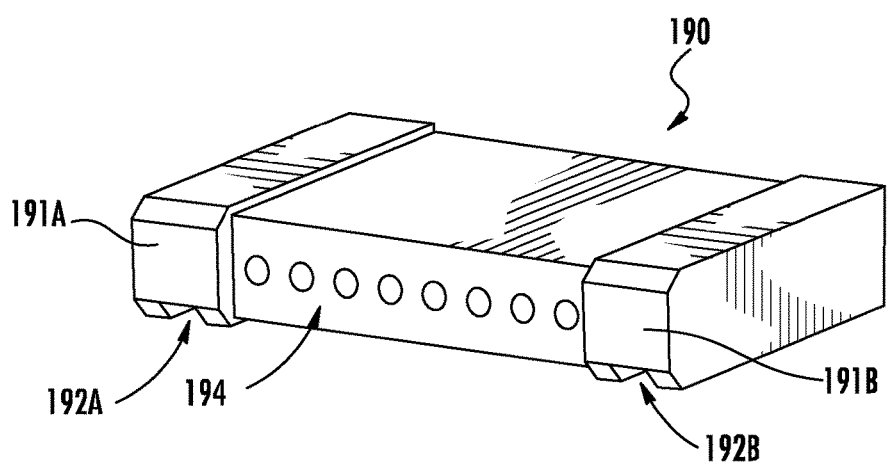
FIG. 14 is a perspective view of the optical turn ferrule depicted in FIG. 12.
Figure 15:
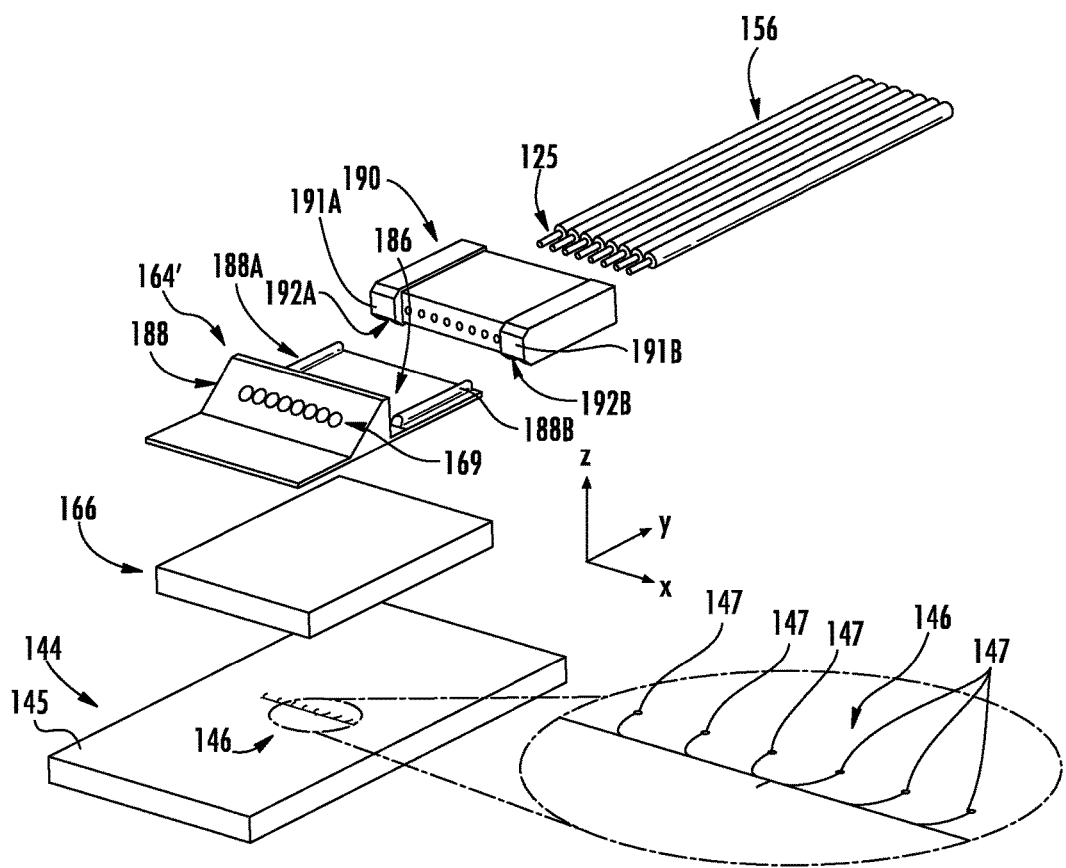
FIG. 15 is an exploded perspective view of the optical turn assembly and an optical substrate shown in FIG. 12 according to one or more embodiments described and illustrated herein.

FIGS. 12-16 depict an optical turn assembly 160' according to another embodiment. FIG. 12 depicts the optical turn assembly 160' in a fully assembled stated and coupled to the optical substrate 144. FIG. 13 depicts the optical turn assembly 160' without an optical turn ferrule 190, described below. FIG. 14 depicts an example optical turn ferrule 190. FIG. 15 is an exploded view of the optical turn assembly 160' illustrated in FIG. 12. FIG. 16 is a cross section view of the optical turn assembly 160' depicted in FIG. 12.

The illustrated optical turn assembly 160' comprises an optical turn module 164', an optical turn ferrule 190, and a base substrate 166 that is coupled to the optical substrate 144. Similar to the embodiment depicted in FIGS. 7-11, the optical turn module 164' may be fabricated from a polymer material that is imprinted onto the base substrate 166, which may be glass. The illustrated optical turn module also includes a datum surface 187', a total internal reflection surface 168', and a plurality of lens elements 169'. The datum surface 187', the total internal reflection surface 168', and the plurality of lens elements 169' may be configured similarly as described above with respect to FIGS. 7-11.

Rather than being positioned within fiber receiving grooves, the second end of the plurality of jumper optical fibers 156 is positioned within the optical turn ferrule 190. Referring to FIG. 14, the optical turn ferrule 190 comprises a plurality of bores 194 in which the plurality of jumper optical fibers 156 is disposed. In the illustrated embodiment, a first datum surface 191A and a second datum surface 191B are provided on either side of the plurality of bores 194. The first and second datum surfaces 191A, 191B may provide a reference for laser cleaving the ends of the plurality of jumper optical fibers 156, as well as for positioning the ends of the plurality of jumper optical fibers 156 with respect to the datum surface 187' of the optical turn module 164'. The plurality of jumper optical fibers 156 may be secured within the bores 194 by an index-matching adhesive, such as a UV curable adhesive.

The optical turn ferrule 190 may be aligned with, and coupled to, the optical turn module 164' in a variety of ways. In the illustrated example, the optical turn module 164' comprises a first alignment rail 188A and a second alignment rail 188B. The optical turn ferrule 190 comprises a first alignment notch 192A and a second alignment notch 192B. When the optical turn ferrule 190 is positioned on the optical turn module 164', the first alignment rail 188A of the optical turn module 164' is positioned within the first alignment notch 192A of the optical turn ferrule 190, and the second alignment rail 188B of the optical turn module 164' is positioned within the second alignment notch 192B of the optical turn ferrule 190. Further, the first and second datum surfaces 191A, 191B contact the datum surface 187' of the optical turn module 164', thereby providing a reference position for the ends of the plurality of jumper optical fibers 156 with respect to the optical turn module 164'.

Any number of alignment rails and notches may be utilized. Additionally, in other embodiments, the optical turn ferrule 190 may be actively aligned with respect to the optical turn module 164' by an active alignment process.

After the optical turn ferrule 190 is aligned with the optical turn module 164', it is secured to the optical turn module 164' with an index-matching adhesive, such as a UV curable index-matching adhesive.

FIG. 15 depicts internal waveguides 146 within the optical substrate 144, which may be fabricated from silicon. The internal waveguides 146 guide the optical signals within the optical substrate 144 to and from optical detectors and laser sources, respectively. The example internal waveguides 146 terminate at internal silicon grating lenses 147 that act to both turn the optical signals (i.e., turn optical signals from the plurality of jumper optical fibers 156 into the internal waveguides 146, and turn optical signals from the plurality of jumper optical fibers 156 into the internal waveguides) as well as diverge the optical signals. The internal waveguides 146 and the internal silicon grating lenses 147 depicted in FIG. 15 may be used in conjunction with any of the optical turn assemblies described herein.

As described in more detail below, the optical turn assemblies 160 described herein should be coupled to the surface 145 of the optical substrate 144 such that the plurality of lens elements 169 is aligned with the internal waveguides 146 (e.g., at the internal silicon grating lenses 147, if provided) along the x- and y-axes to ensure minimal optical coupling loss between the optical substrate 144 and the optical turn module 164.

Referring once again to FIG. 16, in some embodiments the optical signals OS are emitted from the internal silicon grating lenses 147 at an angle α relative to a plane orthogonal to the optical substrate 144. As an example and not a limitation, this angle α may be about 8°, in which case the total internal reflection surface 168' should be about 41° from perpendicular to properly direct the optical signals OS into the plurality of optical fibers 156.

Referring now to FIGS. 17A, 17B, 18 and 19, an example optical turn assembly 160" according to another embodiment is depicted. FIG. 17A is a top-down perspective view of the example optical turn assembly 160", while FIG. 17B is a bottom-up perspective view of the example optical turn assembly 160". FIG. 18 is a perspective, cross-sectional view of the optical turn assembly 160", and FIG. 19 is an elevation, cross-sectional view of the optical turn assembly 160".

Referring generally to FIGS. 17A, 17B, 18 and 19, the illustrated optical turn assembly 160" comprises a lens substrate 196, a base substrate 166, an optical module 164", and a cap 162". The lens substrate 196 comprises a plurality of second lens elements 198 that further condition the optical signals (i.e., converge optical signals propagating toward the optical substrate 144, and converge optical signals propagating from the optical substrate 144) in addition to, or in lieu of, internal waveguides 146 in the optical substrate 144. The lens substrate 196 may be used in embodiments wherein the optical substrate 144 does not include internal silicon waveguides 144, or to overcome long optical lengths, for example. The lens substrate 196 may be made from the same polymer material as the optical turn module 164", and may be similarly printed on a surface of the base substrate 166.

Like the optical turn module 164 depicted in FIGS. 7-11, the illustrated optical turn module 164" includes a datum surface 187", a total internal reflection surface 168" with a plurality of lens elements 169", a plurality of fiber receiving grooves 167", and an alignment notch 180" that mates with an alignment notch 180" of the cap 162". As shown in FIGS. 18 and 19, the plurality of second lens elements 198 of the lens substrate 196 is aligned with the plurality of lens elements 169" of the optical turn module 164" along the x- and y-axes.

It should be understood that the lens substrate 196 may also be utilized in embodiments employing an optical turn ferrule, such as the optical turn ferrule 190 depicted in FIGS. 12-16.

FIG. 20 depicts a cross-sectional perspective view of an optical turn module assembly (without a cap 162) coupled to an optical substrate 144 of an optical assembly 100. The optical turn assembly 160 may be actively aligned with respect to the optical substrate 144 for precise alignment of the plurality of lens elements 169 with the internal waveguides and/or the grating lenses (not shown) within the optical substrate 144.

As shown in FIG. 20 (as well as FIGS. 1A and 1B), the optical turn module assembly 160 is positioned on the optical substrate 144 within notches of the cooling assembly 140. However, other arrangements are also possible.

Referring once again to FIG. 2, an assembly process for assembling the example optical coupling assembly 110 will now be described. The first through fourth jumper cable assemblies 150A-150D are inserted into the first through fourth connector portions 112A-112D of the optical coupling carrier frame 111, respectively. The first through fourth jumper cable assemblies 150A-150D may be secured within the first through fourth connector portions 112A-112D by way of mechanical features (e.g., snap fit or interference fit) and/or by use of an adhesive. Next, a main substrate 130 with an optical substrate 144 and optical integrated circuit 142 stacked thereon is provided.

The optical coupling carrier frame 111 is bonded to a first surface 132 of the main substrate 130 by an adhesive. In the illustrated example, the optical coupling carrier frame 111 surrounds the optical substrate 144 and the optical integrated circuit 142 such that they are within the integrated circuit opening 113 defined by the frame portion 118 of the optical coupling carrier frame 111.

It is noted that the optical coupling carrier frame 111 may be bonded to the main substrate 130 first, followed by inserting the first through fourth jumper cable assemblies 150A-150D.

Once the optical coupling carrier frame 111 and associated first through fourth jumper cable assemblies 150A-150D are coupled to the main substrate 130, the optical turn assemblies 160 of the first through fourth jumper cable assemblies 150A-150D are precisely aligned and bonded to the optical substrate 144 at the proper locations with respect to internal waveguides and/or grating lenses disposed therein 144. An active alignment process may be employed to precisely position the optical turn assemblies 160 on the optical substrate 144. Alternatively, a vision-assist process using one or more cameras may be employed. In another embodiment, high-tolerance mechanical features (not shown) may be integrated into the optical substrate 144 that are utilized to precisely position the optical turn assemblies 160. The optical turn assemblies 160 may be bonded to the optical substrate 144 using an index-matching adhesive.

After the placement of the optical turn assemblies 160 on the optical substrate, the cooling assembly 140 is positioned on the optical integrated circuit 142 such that the cooling assembly 140 and the optical integrated circuit 142 are thermally coupled. Thermal paste may be disposed between the cooling assembly 140 and the optical integrated circuit 142. The cooling assembly 140 may be secured within the assembly by mechanical features (not shown), by bonding, or by a solder process, for example.

Next, the optical assembly 100 is subjected to a solder reflow process to electrically couple various electrical components. For example a solder reflow process may be used to connect the main substrate 130 to a larger motherboard (not shown). Because the optical turn assemblies 160 are bonded to the optical substrate 144, the solder reflow process does not affect the alignment of the optical turn assemblies 160 with respect to the optical substrate 144. Alternatively, the cooling assembly 140 is coupled to the optical integrated circuit 142 after the solder reflow process.

Figure 21:
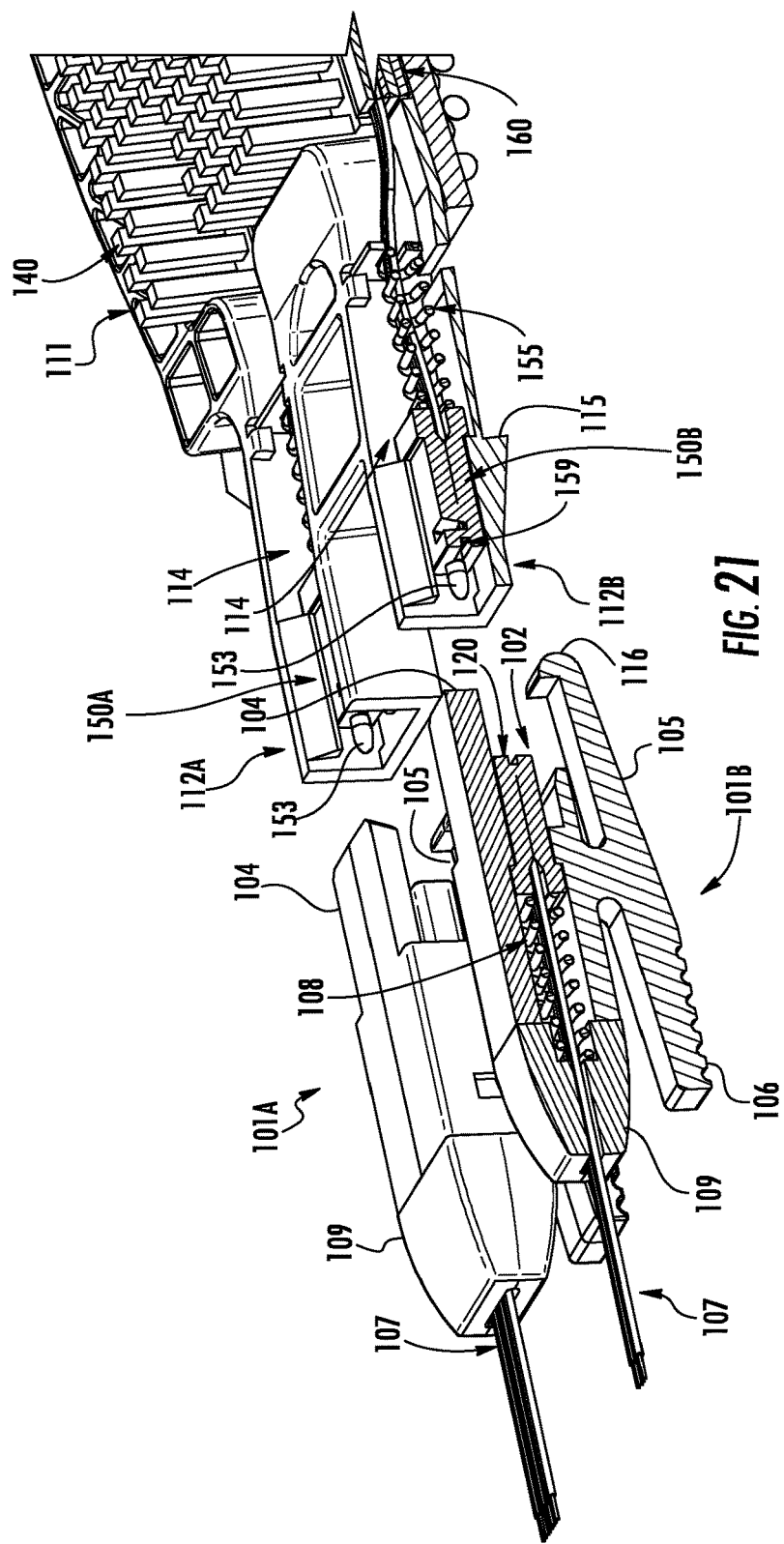
FIG. 21 is a cross sectional, perspective view of two optical cable assemblies and two connector portions of the optical coupling carrier frame depicted in FIG. 1A.

After the optical assembly 100 is fully assembled, the first through fourth optical cable assemblies 101A-101D may be mated to the first through fourth connector portions 112A-112D of the optical coupling carrier frame 111, respectively. FIG. 21 is a close-up, cross-sectional perspective view of the first and second optical cable assemblies 101A, 101B and the first and second connector portions 112A, 112B of the optical coupling carrier frame 111. As the body 122 of the optical connectors 103 are inserted over the first and second connector portions 112A, 112B, the alignment pins 153 of the jumper ferrules 152 are inserted into the alignment bores 126 of the connector ferrule 102 (see FIG. 1D) such that the plurality of lens elements 159 of the jumper ferrule 152 are optically aligned with the plurality of lens elements 120 of the connector ferrule 102 (see FIG. 1D). Additionally, the locking arm pivots as it contacts the sloped surface of the engagement feature 115 until a hooked end portion 116 reaches the end of the engagement feature 115 and pivots back to its normal position. FIG. 1D illustrates the optical connectors 103 of the third and fourth optical cable assemblies 101C, 101D mated to the third and fourth connector portions 112, 112D, respectively. To remove an optical connector 103 from a connector portion, the release tab 106 of the locking arm 105 is pressed to pivot the locking arm 105 so that the connector may be pulled away from the optical coupling carrier frame 111.

In the embodiments described above, optical coupling between the jumper ferrule 152 and the connector ferrule 102 (and therefore between the plurality of jumper optical fibers 156 and the plurality of cable optical fibers 107) is provided by lens elements on the respective ferrules. However, other optical coupling methods between the jumper ferrule 152 and the connector ferrule 102 are also possible. FIGS. 23 and 24 illustrate an alternative embodiment wherein glass blocks with internal laser-printed adiabatic waveguides are coupled to the respective ferrules.

Figure 22:
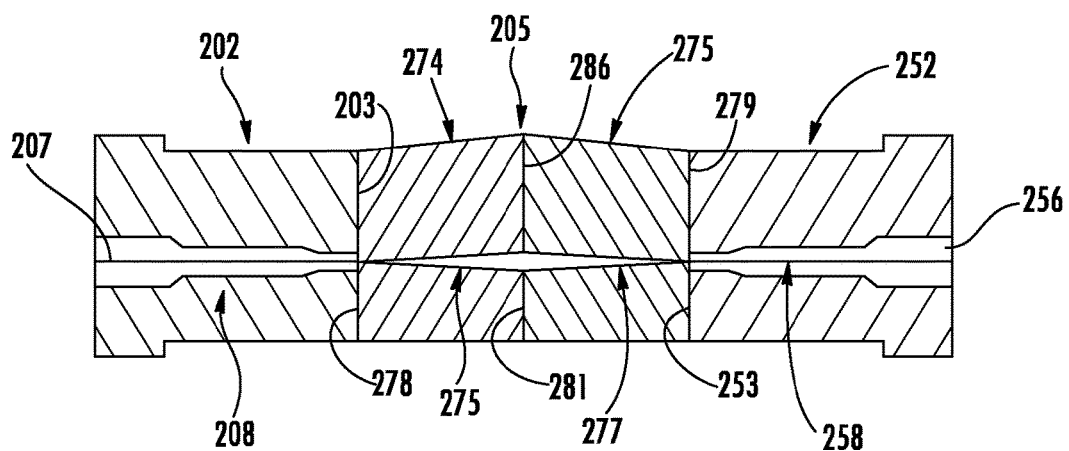
FIG. 22 is a cross sectional view of optical coupling between a connector optical coupling block and a jumper optical coupling block comprising tapered internal waveguides according to one or more embodiments described and illustrated herein.

FIG. 22 is a partial cross sectional view of a connector ferrule 202 and a connector optical coupling block 274 configured to be disposed within a connector body that is mated, at mating interface 205, to a jumper optical coupling block 276 and a jumper ferrule 252 configured to be disposed within a connector portion of an optical coupling carrier frame. The connector optical coupling block 274 and the jumper optical coupling block 276 are made of glass. The connector optical coupling block 274 has a plurality of tapered internal waveguides 275 that is optically coupled to a plurality of connector optical fibers 207. Similarly, the jumper optical coupling block 276 has a plurality of tapered internal waveguides 277 that is optically coupled to the plurality of jumper optical fibers 256. As described in more detail below, the tapered internal waveguides 275, 277 may be laser-written into the connector optical coupling block 274 and the jumper optical coupling block 276, respectively, by an in-situ laser writing process. The tapered internal waveguides 275, 277 both guide and expand the single mode optical signals so that they may pass through the mating interface 205 between the connector optical coupling block 274 and the jumper optical coupling block 276.

The plurality of connector optical fibers 207 is positioned in internal bores 208 of the connector ferrule 202, the ends of which are exposed at a coupling face 203 of the connector ferrule 202. The coupling face 203 of the connector ferrule 202 is coupled to coupling face 278 of the connector optical coupling block 274 such that the plurality of tapered internal waveguides 275 is aligned with the plurality of connector optical fibers 207. Similarly, the plurality of jumper optical fibers 256 is disposed within internal bores 258 of the jumper ferrule 252, the ends of which are exposed at a coupling face 253 of the jumper ferrule 252. The coupling face 253 of the jumper ferrule 252 is coupled to coupling face 279 of the jumper optical coupling block 276 such that the plurality of tapered internal waveguides 277 is aligned with the plurality of jumper optical fibers 256.

When the mating face 280 of the connector optical coupling block 274 is mated with the mating face 281 of the jumper optical coupling block 276 to form mating interface 205, the plurality of tapered internal waveguides 275 of the connector optical coupling block 274 is aligned with the plurality of tapered internal waveguides 277 of the jumper optical coupling block 276. The tapered internal waveguides 275, 277 expand the single mode optical signals so that they may pass through the mating interface 205 with minimized optical coupling losses.

The connector optical coupling block 274 and the jumper optical coupling block 276 may be disposed within their respective ferrules, or in a separate ferrule or housing. In some embodiments, the tapered internal waveguides 275, 277 may be written in situ using alignment pin bores as references (e.g., the alignment pin bores 123 of the jumper ferrule 152 and the alignment bores 126 of the connector ferrule 102). Thus, the resulting assembly provides for low optical loss mating.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical coupling assembly comprising:
   an optical coupling carrier frame comprising:
   a frame portion defining an integrated circuit opening operable to receive an integrated circuit assembly; and
   at least one connector portion extending from the frame portion, wherein the at least one connector portion comprises a channel operable to receive an optical connector of an optical cable assembly; and
   at least one jumper cable assembly disposed within the at least one connector portion, the at least one jumper cable assembly comprising:
   a plurality of jumper optical fibers having a first end and a second end;
   a jumper ferrule coupled to the first end of the plurality of jumper optical fibers; and
   an optical turn assembly coupled to the second end of the plurality of jumper optical fibers, wherein the optical turn assembly is operable to optically turn optical signals propagating within the optical turn assembly from a first direction to a second direction.

2. The optical coupling assembly of claim 1, wherein the at least one jumper cable assembly further comprises at least one bias member disposed around the plurality of jumper optical fibers.

3. The optical coupling assembly of claim 1, wherein the jumper ferrule further comprises a first alignment pin bore and a second alignment pin bore, and the at least one jumper cable assembly further comprises a first alignment pin disposed within the first alignment pin bore and a second alignment pin disposed within the second alignment pin bore.

4. The optical coupling assembly of claim 1, wherein the jumper ferrule comprises a plurality of optical coupling elements optically coupled to the plurality of jumper optical fibers.

5. The optical coupling assembly of claim 4, wherein the plurality of optical coupling elements are configured as a plurality of lens elements within a coupling face of the jumper ferrule.

6. The optical coupling assembly of claim 5, wherein:
the at least one jumper cable assembly further comprises an optical coupling block coupled to a coupling face of the jumper ferrule; and
the optical coupling block comprises a plurality of tapered internal waveguides optically coupled to the plurality of jumper optical fibers.

7. The optical coupling assembly of claim 1, wherein:
the optical turn assembly comprises an optical turn module comprising a datum surface and a total internal reflection surface transverse to the datum surface;
the second end of the plurality of jumper optical fibers is positioned adjacent to the datum surface;
the total internal reflection surface further comprises a plurality of lens elements optically coupled to the plurality of jumper optical fibers; and
optical signals propagating within the optical turn module are turned by the total internal reflection surface and are conditioned by the plurality of lens elements.

8. The optical coupling assembly of claim 7, wherein:
the optical turn module further comprises a plurality of fiber receiving grooves; and
the plurality of jumper optical fibers is positioned within the plurality of fiber receiving grooves.

9. The optical coupling assembly of claim 8, wherein:
the optical turn module comprises a plurality of walls; and
the optical turn assembly further comprises a cap positioned between the plurality of walls and enclosing the total internal reflection surface and the plurality of fiber receiving grooves.

10. The optical coupling assembly of claim 7, wherein:
the optical turn assembly further comprises an optical turn ferrule comprising a plurality of bores and a coupling face;
the second end of the plurality of jumper optical fibers is disposed within the plurality of bores; and
the coupling face of the optical turn ferrule is adjacent to the datum surface.

11. The optical coupling assembly of claim 10, wherein:
the optical turn module comprises a first alignment rail and a second alignment rail;
the optical turn ferrule comprises a first alignment notch and a second alignment notch; and
the optical turn ferrule is disposed on the optical turn module such that the first alignment rail is disposed within the first alignment notch and the second alignment rail is disposed within the second alignment notch.

12. The optical coupling assembly of claim 7, wherein:
the optical turn assembly further comprises a base substrate; and
the optical turn module is coupled to a surface of the base substrate.

13. The optical coupling assembly of claim 12, wherein:
the optical turn assembly further comprises a lens substrate coupled to a second surface of the base substrate; and the lens substrate comprise a plurality of second lens elements optically coupled to the plurality of lens elements on the total internal reflection surface.

14. The optical coupling assembly of claim 1, wherein the plurality of jumper optical fibers extend between and terminate at the first end and the second end.

15. An optical assembly comprising:
a main substrate comprising a first surface and a second surface;
an optical substrate comprising a first surface, a second surface and a plurality of internal waveguides, wherein the second surface of the optical substrate is electrically coupled to the first surface of the main substrate;
an optical integrated circuit electrically coupled to the first surface of the optical substrate; and
an optical coupling carrier frame coupled to the first surface of the optical substrate, the optical coupling carrier frame comprising:
a frame portion defining an integrated circuit opening, wherein the optical integrated circuit is disposed within the integrated circuit opening of the optical coupling carrier frame; and
at least one connector portion extending from the frame portion, wherein the at least one connector portion comprises a channel operable to receive an optical connector of an optical cable assembly.

16. The optical assembly of claim 15, further comprising a cooling assembly thermally coupled to the optical integrated circuit and positioned within the integrated circuit opening of the optical coupling carrier frame.

17. The optical assembly of claim 15, wherein a surface of the frame portion defines a first plane, and the at least one connector portion extends from the frame portion at an angle with respect to the first plane.

18. The optical assembly of claim 15, further comprising at least one jumper cable assembly disposed within the at least one connector portion, the at least one jumper cable assembly comprising:
a plurality of jumper optical fibers having a first end and a second end;
a jumper ferrule coupled to the first end of the plurality of jumper optical fibers; and
an optical turn assembly coupled to the second end of the plurality of jumper optical fibers, wherein:
the optical turn assembly is coupled to the first surface of the optical substrate;
the optical turn assembly is operable to optically turn optical signals propagating within the optical turn assembly from a first direction to a second direction such that the plurality of jumper optical fibers is optically coupled to the plurality of internal waveguides of the optical substrate.

19. The optical assembly of claim 18, wherein:
the optical turn assembly comprises an optical turn module comprising a datum surface and a total internal reflection surface transverse to the datum surface;
the second end of the plurality of jumper optical fibers is positioned adjacent to the datum surface;
the total internal reflection surface further comprises a plurality of lens elements optically coupled to the plurality of jumper optical fibers; and
optical signals propagating within the are turned by the total internal reflection surface and are conditioned by the plurality of lens elements.

20. The optical assembly of claim 18, wherein:
the at least one connector portion comprises a first connector portion, a second connector portion, a third connector portion, and a fourth connector portion;
the first connector portion and the second connector portion extend from a first edge of the frame portion;
the third connector portion and the fourth connector portion extend from a second edge of the frame portion; and
the first edge of the frame portion is opposite from the second edge of the frame portion.

21. The optical assembly of claim 20, wherein the at least one jumper cable assembly comprises a first jumper cable assembly disposed within the first connector portion, a second jumper cable assembly disposed within the second connector portion, a third jumper cable assembly disposed within the third connector portion, and a fourth jumper cable assembly disposed within the fourth connector portion.

22. The optical assembly of claim 18, further comprising at least one optical cable assembly comprising:
a connector body operable to be removably coupled to the at least one connector portion;
a plurality of cable optical fibers disposed within the connector body
a connector ferrule disposed within the connector body, wherein a portion of the plurality of cable optical fibers is disposed within the connector ferrule, and the connector ferrule is configured to a be coupled to the jumper ferrule of the at least one jumper cable assembly such that the plurality of cable optical fibers is optically coupled to the plurality of jumper optical fibers.

23. The optical coupling assembly of claim 15, wherein the optical substrate further comprises internal silicon grating lenses and wherein the plurality of internal waveguides terminate at the internal silicon grating lenses.

24. An optical coupling carrier frame comprising:
a frame portion defining an integrated circuit opening, the integrated circuit opening defining a first plane; and
at least one connector portion extending from the frame portion, wherein:
the at least one connector portion comprises a channel operable to receive an optical connector of an optical cable assembly; and
the at least one connector portion extends upward from the frame portion at an angle with respect to the first plane.

25. The optical coupling carrier frame of claim 24, wherein the at least one connector portion comprises a first side wall, a second side wall, and a floor extending from the first side wall to the second side wall.

26. The optical coupling carrier frame of claim 24, wherein:
the at least one connector portion comprises a first connector portion, a second connector portion, a third connector portion, and a fourth connector portion;
the first connector portion and the second connector portion extend from a first edge of the frame portion;
the third connector portion and the fourth connector portion extend from a second edge of the frame portion; and
the first edge of the frame portion is opposite from the second edge of the frame portion.

27. The optical coupling carrier frame of claim 26, wherein:
a surface of the frame portion defines a first plane; and
the first, second, third and fourth connector portions extend from the frame portion at an angle with respect to the first plane.

28. The optical coupling carrier frame of claim 24, wherein the optical coupling carrier frame is molded from a polymer having a coefficient of thermal expansion within a range of about 6 ppm/° C. to about 10 ppm/° C.

* * * * *

UNITED STATES PATENT AND TRADEMARK OFFICE
CERTIFICATE OF CORRECTION

PATENT NO. : 10,168,492 B2
APPLICATION NO. : 15/014560
DATED : January 1, 2019
INVENTOR(S) : Douglas Llewellyn Butler et al.

Page 1 of 1

It is certified that error appears in the above-identified patent and that said Letters Patent is hereby corrected as shown below:

On the Title Page

In Column 1, item (72), Inventors, Lines 6-7, delete "Chine Grove," and insert -- China Grove, --, therefor.

In the Claims

In Column 16, Line 65, Claim 19, delete "within the are" and insert -- within the optical turn module are --, therefor.

In Column 17, Line 29, Claim 22, delete "to a be" and insert -- to be --, therefor.

In Column 17, Line 34, Claim 23, delete "optical coupling assembly" and insert -- optical assembly --, therefor.

Signed and Sealed this
Twenty-eighth Day of January, 2020

Andrei Iancu
*Director of the United States Patent and Trademark Office*